United States Patent
Sakaguchi et al.

(10) Patent No.: US 10,401,844 B2
(45) Date of Patent: Sep. 3, 2019

(54) SIMULATOR, SIMULATION METHOD, AND SIMULATION PROGRAM

(71) Applicant: OMRON Corporation, Kyoto-shi, Kyoto (JP)

(72) Inventors: Yasunori Sakaguchi, Takatsuki (JP); Haruna Shimakawa, Kyoto (JP); Katsushige Ohnuki, Kyoto (JP); Yuichi Doi, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 289 days.

(21) Appl. No.: 15/342,153

(22) Filed: Nov. 3, 2016

(65) Prior Publication Data

US 2017/0139407 A1    May 18, 2017

(30) Foreign Application Priority Data

Nov. 18, 2015 (JP) ................. 2015-225782

(51) Int. Cl.
*G06T 17/00* (2006.01)
*G05B 19/418* (2006.01)
*B25J 9/16* (2006.01)

(52) U.S. Cl.
CPC ...... *G05B 19/41885* (2013.01); *B25J 9/1671* (2013.01); *B25J 9/1697* (2013.01);
(Continued)

(58) Field of Classification Search
CPC ............... G05B 19/41885; G06T 17/00
See application file for complete search history.

(56) References Cited

U.S. PATENT DOCUMENTS

2005/0055134 A1    3/2005  Okuda et al.
2015/0130794 A1    5/2015  Katsuda
(Continued)

FOREIGN PATENT DOCUMENTS

CN    104626153 A    5/2015
CN    104802173 A    7/2015
(Continued)

OTHER PUBLICATIONS

The office action dated Oct. 31, 2018 in a counterpart Chinese patent application.

*Primary Examiner* — Thomas L Dickey
(74) *Attorney, Agent, or Firm* — Metrolex IP Law Group, PLLC

(57) ABSTRACT

A structure allows more efficient simulation using preliminary obtained image data for a target such as a workpiece. A simulator includes a creating unit that virtually creates a simulation target system in a three-dimensional virtual space, a measurement unit that performs image measurement of preliminary obtained image data using a visual sensor and outputs a measurement result, a reception unit that receives a setting of an imaging area defined for the visual sensor in a manner associated with the created system, a calculation unit that calculates a transform parameter based on a relative positional relationship between the created system and the set imaging area, and an execution unit that receives an input of a result obtained by transforming the measurement result generated by the measurement unit using the transform parameter, and executes a control operation in accordance with a control program associated with the system.

19 Claims, 18 Drawing Sheets

(52) U.S. Cl.
CPC ............. *G05B 2219/39031* (2013.01); *G05B 2219/40311* (2013.01); *Y02P 90/26* (2015.11)

(56) References Cited

U.S. PATENT DOCUMENTS

2015/0161808 A1* 6/2015 Oya .................. G05B 19/0426
  345/633
2015/0202776 A1 7/2015 Atohira et al.
2015/0277405 A1 10/2015 Ito et al.

FOREIGN PATENT DOCUMENTS

| | | |
|---|---|---|
| CN | 104951861 A | 9/2015 |
| DE | 102015000589 A1 | 8/2015 |
| EP | 2497611 A2 | 9/2012 |
| EP | 2843556 A1 | 3/2015 |
| JP | 2002-297226 A | 10/2002 |
| JP | 2007-017424 A | 1/2007 |
| JP | 2013-191128 A | 9/2013 |
| JP | 2015-136770 A | 7/2015 |

* cited by examiner

Transform into coordinates in other coordinate system

SIMULATOR, SIMULATION METHOD, AND SIMULATION PROGRAM

CROSS-REFERENCE TO RELATED APPLICATION

This application claims priority from prior Japanese Patent Application No. 2015-225782 filed with the Japan Patent Office on Nov. 18, 2015, the entire contents of which are incorporated herein by reference.

FIELD

The present invention relates to a simulator, a simulation method, and a simulation program for estimating the behavior of a system including a visual sensor.

BACKGROUND

In the field of factory automation (FA), automatic control techniques using visual sensors are used widely. Such techniques include automatic processing in which an image of a target such as a workpiece is captured, the captured image undergoes image measurement such as pattern matching, and various control devices operate based on the measurement results.

A system including a visual sensor involves calibration of the measurement results transmitted from the visual sensor before outputting the resultant data to a controller. For example, Japanese Unexamined Patent Application Publication No. 2007-017424 (Patent Literature 1) describes a technique for automated positional alignment performed while measuring a reference mark on a workpiece mounted on an XYθ stage.

Designing or examining the system to be controlled with the above automatic control technique may need preliminary evaluation of the performance of the entire system. In response to this, a technique has been developed for virtually creating a system and simulating its operation. For example, Japanese Unexamined Patent Application Publication No. 2013-191128 (Patent Literature 2) describes a technique for integrated simulations of a mechanical system including a visual sensor in a real space corresponding to a virtual imaging unit. With the technique described in Patent Literature 2, a 3D simulator and a visual sensor simulator cooperate with each other to virtually generate captured images of a workpiece in a 3D space at predetermined timings. With the technique described in Patent Literature 2, a sample object arranged at a predetermined calibration position is virtually captured and used for calibration.

Japanese Unexamined Patent Application Publication No. 2015-136770 (Patent Literature 3) describes a technique for 3D modeling of a robot, a visual sensor, and a target in a virtual space in the same manner as in Patent Literature 2. With this technique, images of the target are virtually captured with the visual sensor to generate computer graphics images. The technique described in Patent Literature 3 eliminates calibration for adjustment between the robot and the visual sensor by calculating the positional relationship between the robot coordinate system and the sensor coordinate system.

CITATION LIST

Patent Literature

Patent Literature 1: Japanese Unexamined Patent Application Publication No. 2007-017424

Patent Literature 2: Japanese Unexamined Patent Application Publication No. 2013-191128

Patent Literature 3: Japanese Unexamined Patent Application Publication No. 2015-136770

SUMMARY

Technical Problem

The techniques described in Patent Literature 2 and Patent Literature 3 further involve predefining of workpieces or targets. When, for example, the existing system is to be improved or when the existing system is to be replaced with another system, workpieces are also to be modeled.

A structure is to be developed to achieve more efficient simulation of a system using preliminary obtained image data for a target such as a workpiece.

Solution to Problem

A simulator according to one aspect of the present invention estimates a behavior of a system including a visual sensor. The simulator includes a creating unit that virtually creates a simulation target system in a three-dimensional virtual space, a measurement unit that performs image measurement of preliminary obtained image data to be performed using the visual sensor and output a measurement result, a reception unit that receives a setting of an imaging area defined for the visual sensor in a manner associated with the created system, a calculation unit that calculates a transform parameter based on a relative positional relationship between the created system and the set imaging area, and an execution unit that receives an input of a result obtained by transforming the measurement result generated by the measurement unit using the transform parameter, and executes a control operation in accordance with a control program associated with the system.

In some embodiments, the created system includes a robot that operates in accordance with a result of the control operation, and the transform parameter allows transformation of coordinates in a camera coordinate system output as the measurement result into coordinates in a robot coordinate system defining a behavior of the robot.

In some embodiments, the simulator further includes a reproduction unit that reproduces a behavior of the created system using time-series data for the control operation output from the execution unit. The reproduction herein refers to a computation performed by the simulator for creating the system in the virtual space and causing the system to operate virtually. The reproduction includes simulation.

In some embodiments, the image measurement includes recognizing a workpiece based on a pre-registered image pattern, and the reproduction unit displays, in the created system, the workpiece recognized by the measurement unit, and updates a position of the workpiece over time.

In some embodiments, the reproduction unit transforms coordinates of the workpiece obtained through the image measurement into coordinates in the world coordinate system defining the created system, and displays the workpiece in the created system.

In some embodiments, the calculation unit calculates a transform coefficient for transformation between a unit movement of a device that moves the workpiece in the created system and a moving speed of the workpiece in the created system.

In some embodiments, the image measurement includes determining whether input image data satisfies a pre-registered condition, and the reproduction unit additionally includes information indicating whether a workpiece displayed in the created system satisfies the pre-registered condition.

In some embodiments, the reproduction unit outputs the measurement result from the measurement unit, together with the behavior of the created system, in correspondence with a timing when the measurement result is output.

In some embodiments, the reproduction unit outputs target image data, together with the measurement result from the measurement unit.

A simulation method according to another aspect of the present invention is implemented by a computer for estimating a behavior of a system including a visual sensor. The simulation method includes virtually creating the system to be simulated in a three-dimensional virtual space, performing image measurement of preliminary obtained image data to be performed using the visual sensor, and outputting a measurement result, receiving a setting of an imaging area defined for the visual sensor associated with the created system, calculating a transform parameter based on a relative positional relationship between the created system and the set imaging area, and receiving an input of a result obtained by transforming the measurement result using the transform parameter, and executing a control operation in accordance with a control program associated with the system.

A simulation program according to another aspect of the present invention is used to estimate a behavior of a system including a visual sensor. The simulation program causes a computer to implement virtually creating the system to be simulated in a three-dimensional virtual space, performing image measurement of preliminary obtained image data to be performed using the visual sensor, and outputting a measurement result, receiving a setting of an imaging area defined for the visual sensor in a manner associated with the created system, calculating a transform parameter based on a relative positional relationship between the created system and the set imaging area, and receiving an input of a result obtained by transforming the measurement result using the transform parameter, and executing a control operation in accordance with a control program associated with the system.

Advantageous Effects

Embodiments of the present invention improve the efficiency of simulation of a system using preliminary obtained image data for a target such as a workpiece.

DETAILED DESCRIPTION

First Embodiment

Figure 1:
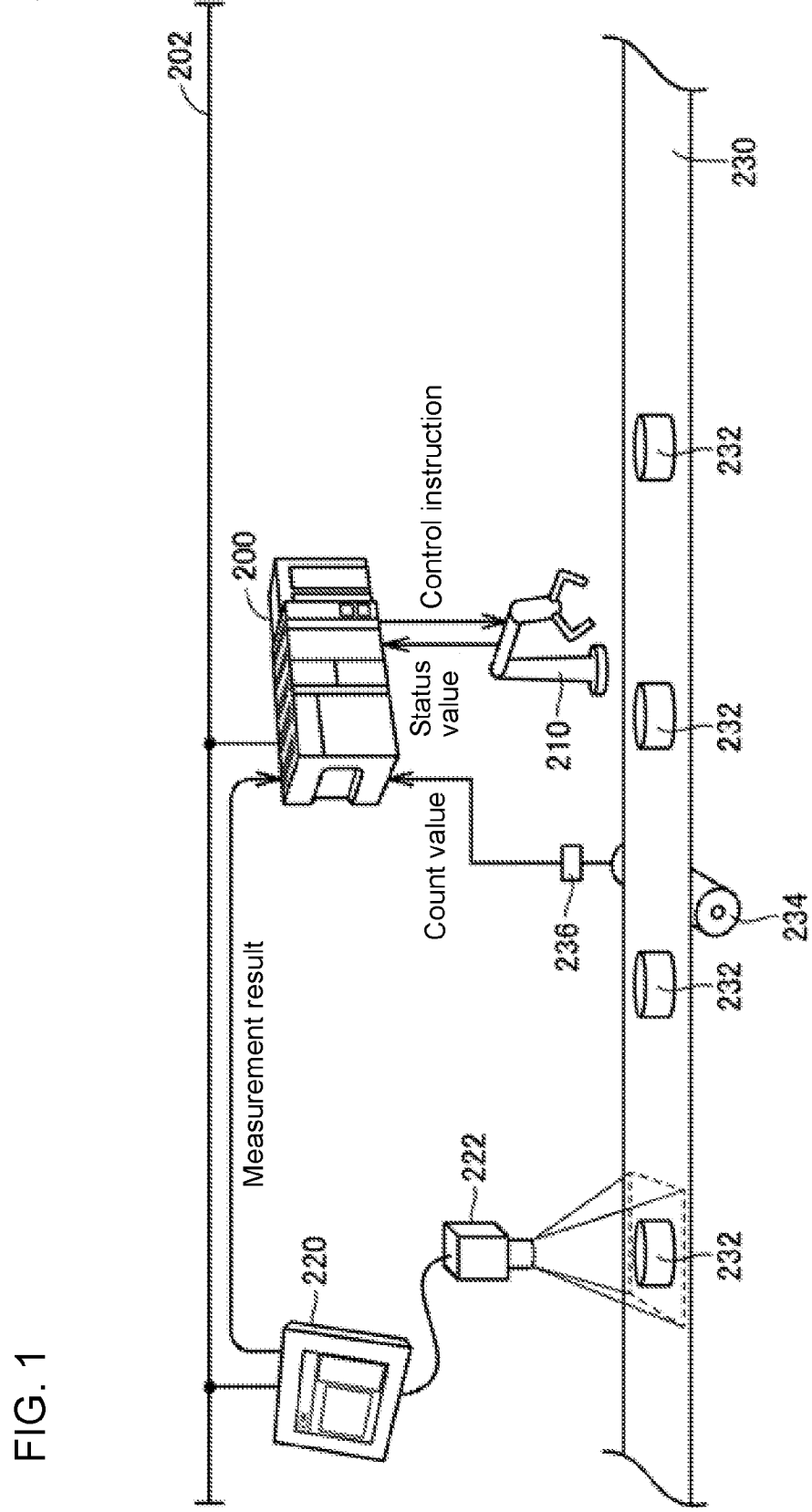
FIG. 1 is a schematic diagram showing the configuration of a system to be simulated by the simulator according to one embodiment.

Embodiments of the present invention will now be described in detail with reference to the drawings. The same or corresponding components in the figures are given the same reference numerals, and will not be described redundantly.

A. Overview

A simulator according to the present embodiment estimates the behavior of a system including a visual sensor. More specifically, the simulator according to the present embodiment uses image data representing images actually captured by an imaging unit to estimate the behavior or other acts of a system that operates independently of an image capturing operation performed by the imaging unit. Although the simulator simulates a manufacturing system including one or more devices in the embodiment described below, the simulator may simulate any other system.

The simulation performed by the simulator according to the present embodiment will now be described briefly.

FIG. 1 is a schematic diagram showing the configuration of a system to be simulated by the simulator according to the present embodiment. With reference to FIG. 1, for example, a manufacturing system 1 includes a robot 210, which picks up a workpiece 232 transported continuously on a conveyor 230, and transfers to and places the workpiece 232 at a predetermined position. This series of actions performed by the robot 210, or picking, transferring, and placing, may be referred to as the pick-and-place operation. To enable the pick-and-place operation of the robot 210, an imaging unit 222 captures an image of an imaging area defined on a part of the conveyor 230, and a visual sensor 220 performs image measurement including measurement of the image data representing the image captured by the imaging unit 222 and obtains the measurement results including information about the position and the orientation of the workpiece 232. A controller 200 executes a predetermined control logic based on the measurement results obtained by the visual sensor 220, and generates a control instruction for the robot 210. To generate the control instruction for the robot 210, the controller 200 refers to the status value of the robot 210, and an encoder value provided from an encoder 236, which is connected to a drive roller 234 for driving the conveyor 230. The controller 200 and the visual sensor 220 are connected to each other with a network 202 to allow data communication between them. The measurement results are transmitted from the visual sensor 220 to the controller 200 through the network 202. The controller 200 typically includes a programmable logic controller (PLC).

The manufacturing system 1 shown in FIG. 1 may examine its processing capability by increasing the moving speed of the conveyor 230 and including an additional robot 210.

Figure 2:
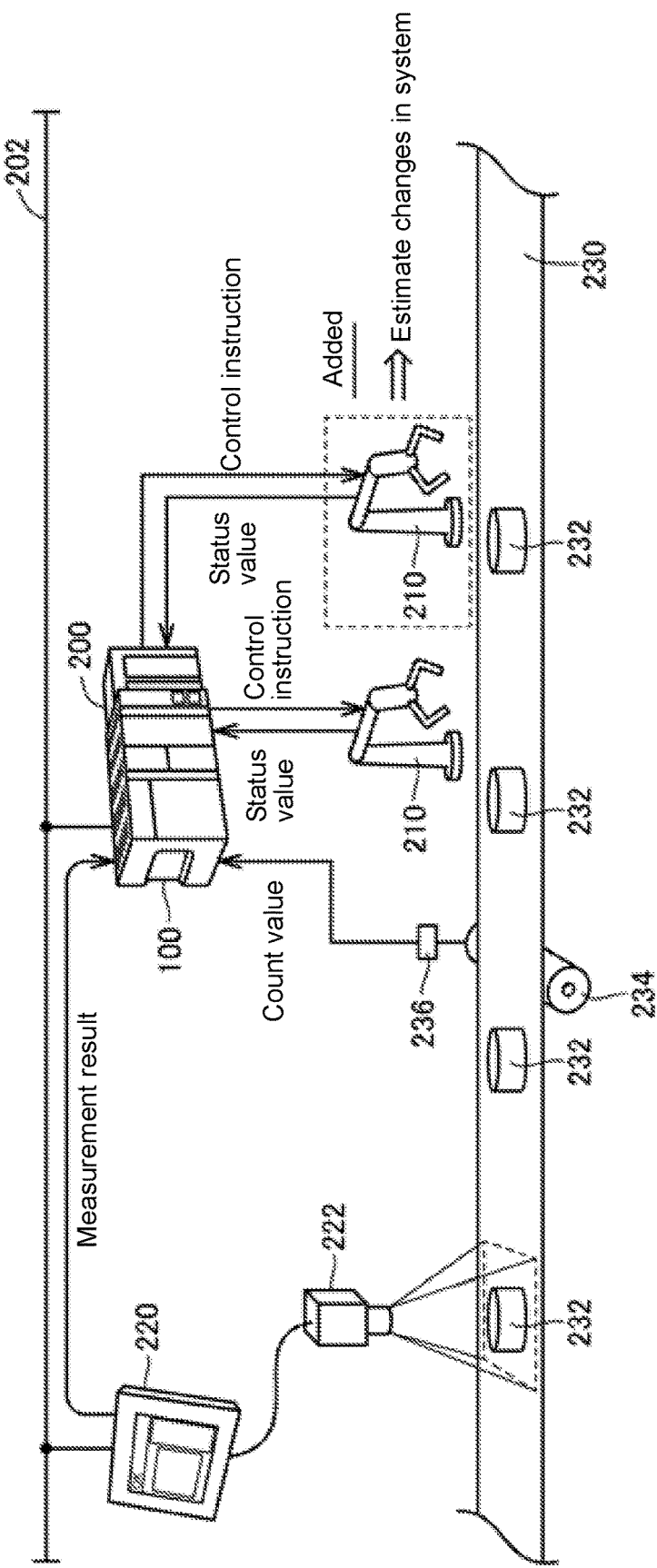
FIG. 2 is a schematic diagram showing the configuration of a manufacturing system including a robot added to the configuration of the manufacturing system shown in FIG. 1.

FIG. 2 is a schematic diagram showing the configuration of a manufacturing system 2 including a robot 210 added to the configuration of the manufacturing system 1 shown in FIG. 1. Although actually adding the robot 210 to the system as shown in FIG. 2 and checking its processing capability may be intended, actually installing the system is often difficult due to the cost or time constraints. The simulator is to be designed to achieve simpler estimation of changes in the system caused by such an additional device as shown in FIG. 2.

In response to this, the simulator according to the present embodiment virtually creates a system to be simulated in a three-dimensional virtual space, and incorporates actually captured image data into the virtually created system to achieve more efficient simulation.

Figure 3:
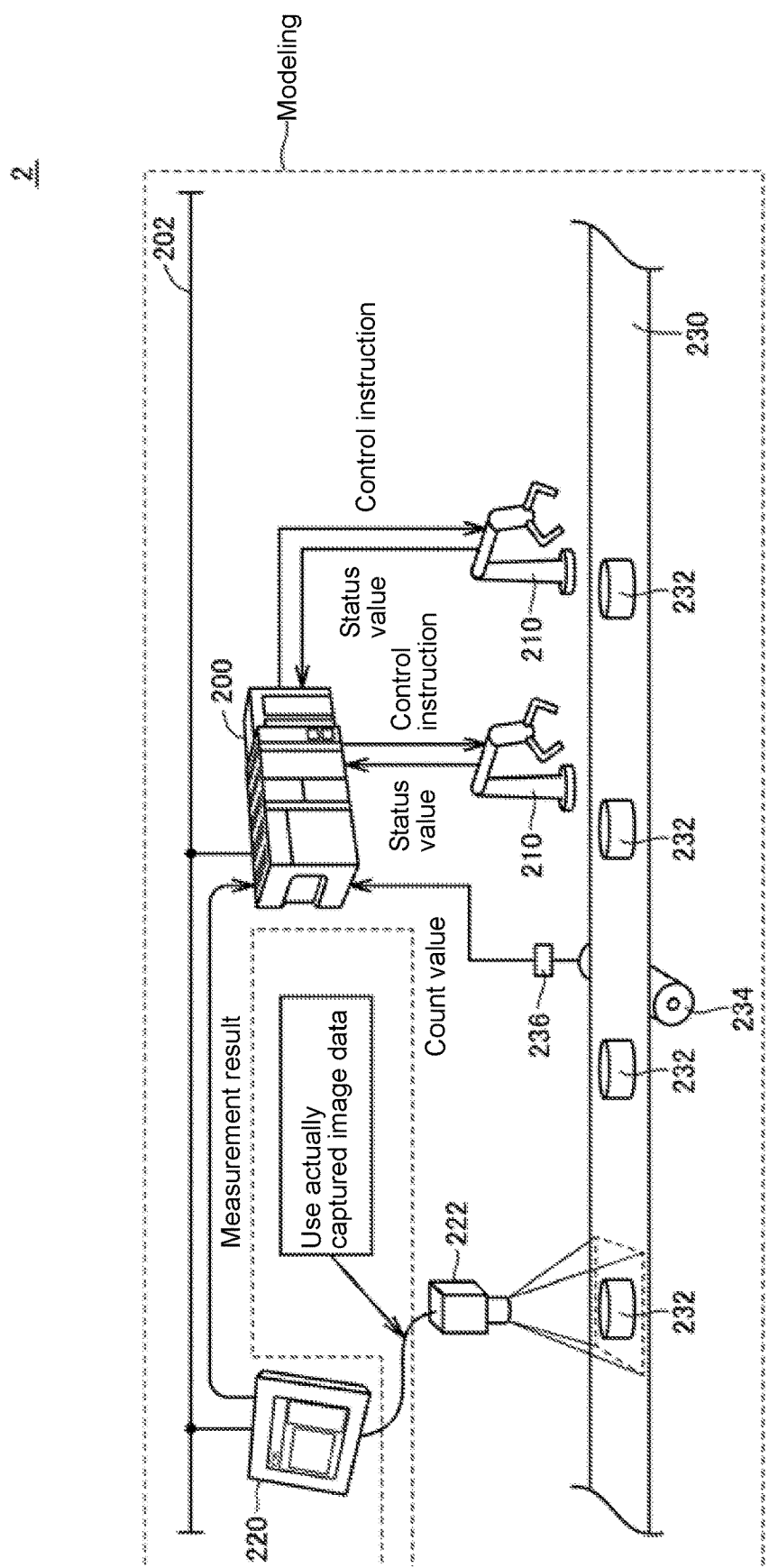
FIG. 3 is a schematic diagram describing a simulation method implemented by the simulator according to the embodiment.

FIG. 3 is a schematic diagram describing a simulation method implemented by the simulator according to the present embodiment. With reference to FIG. 3, the simulator models the entire manufacturing system 2, which is to be simulated, and incorporates image data representing an image captured by the imaging unit 222 into this model. In other words, the simulator uses the actually captured image data in the model of the manufacturing system 1.

The simulator with this structure simulates the performance of any manufacturing system while incorporating the status of the actual manufacturing system.

The actually captured image data may not be the data captured in the manufacturing system 1 shown in FIGS. 1 and 2 that has yet to be improved, and may be data representing any image captured by any system or under any situation. In other words, the image data may be any data including chronological change information about a target to be simulated (typically, a workpiece 232).

The Image data may be moving image data or data representing a plurality of still images arranged chronologically. The reproduction speed of the moving image data or the update frequency of the data representing the still images can be adjusted as appropriate to adjust the chronological changes (or the moving speed) of a workpiece to be controlled. Adjusting the image data incorporated in the system model in this manner allows the simulation to yield an optimal value for the chronological changes of the control target.

Additionally, still images that are not captured sequentially but are captured in different situations may be arranged as chronologically changing images and used as moving image data. Although the images generated in this case have no overlapping between them, this causes substantially no problem in performing the simulation.

B. Hardware Configuration of Simulator

The hardware configuration of the simulator 100 according to the present embodiment will now be described. The simulator 100 according to the embodiment is implemented typically by one or more computers executing a program.

Figure 4:
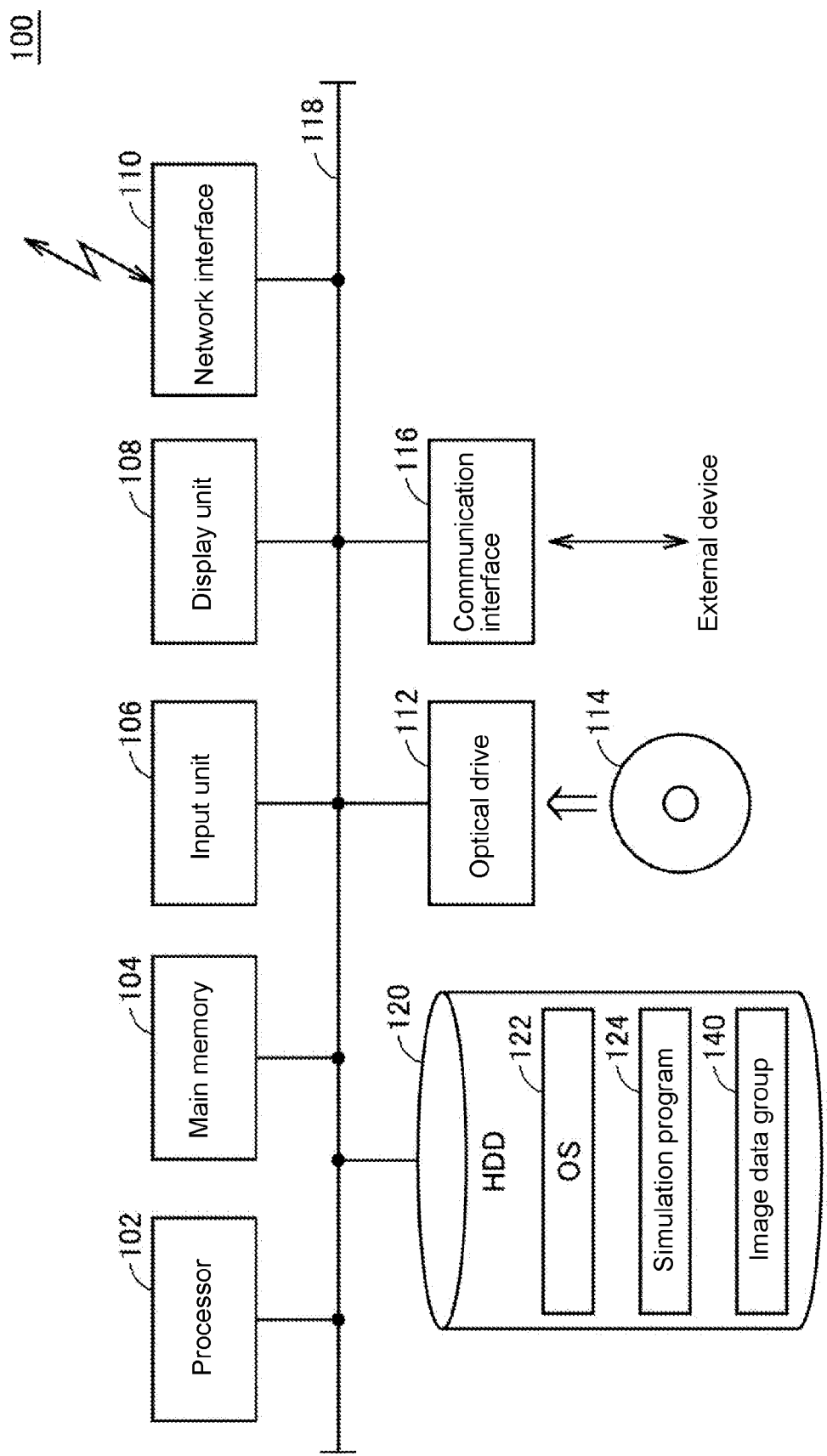
FIG. 4 is a schematic diagram showing the hardware configuration of the simulator according to the embodiment.

FIG. 4 is a schematic diagram showing the hardware configuration of the simulator 100 according to the present embodiment. With reference to FIG. 4, the simulator 100 is, for example, a computer having the general-purpose computer architecture. The simulator 100 includes a processor 102, a main memory 104, an input unit 106, a display unit 108, a network interface 110, a hard disk drive (HDD) 120, an optical drive 112, and a communication interface 116. These components are connected to each other with an internal bus 118 in a communicable manner.

The processor 102 loads a program stored in the hard disk drive 120 into the main memory 104 and executes the program to implement the functions and the processing described later. The main memory 104 is a volatile memory and functions as a working memory used for program execution by the processor 102.

The input unit 106 typically includes a keyboard, a mouse, a touch panel, and a touchpad, and receives a user operation. The display unit 108 includes a display and an indicator, and presents various pieces of information to a user.

The network interface 110 exchanges data with external devices such as a server through a network. The optical drive 112 reads various programs from an optical disc 114 or other media, and installs the programs into the hard disk drive 120. The communication interface 116 is, for example, a universal serial bus (USB) communication interface, and exchanges data with external devices such as an auxiliary storage through local communications.

The hard disk drive 120 stores an operating system (OS) 122, a program for providing the functions of the simulator, such as a simulation program 124, and an image data group 140 including preliminarily obtained input images used for simulation.

Although an intended program is installed in the simulator 100 via the optical drive 112 in the configuration example shown in FIG. 4, a program may be downloaded from a server or other devices on the network.

When the simulator is a general-purpose computer as described above, an OS may be installed on the computer to provide the basic function of the computer, in addition to a program for providing the functions according to the present embodiment. In this case, the simulation program according to the present embodiment may call program modules included in the OS in a predetermined order and/or at predetermined timings as appropriate to perform processing. More specifically, the program according to the present embodiment may not include these program modules and may cooperate with the OS to perform processing. The program according to the present embodiment may not include such modules.

The program according to the present embodiment may be incorporated as a part of another program to be combined. The program according to the present embodiment may not thus include modules of the program to be combined, and may cooperate with the program to achieve processing. In other words, the simulation program according to the present embodiment may be incorporated in the other program.

Although FIG. 4 shows the simulator 100 that is a general-purpose computer, the simulator 100 may be partly or entirely implemented using a dedicated circuit (e.g., an application specific integrated circuit, or ASIC). Additionally, an external device may perform a part of the processing of the simulator 100.

C. Functional Structure of Simulator

The functional structure of the simulator according to the present embodiment will now be described.

c1: Basic Structure

Figure 5:
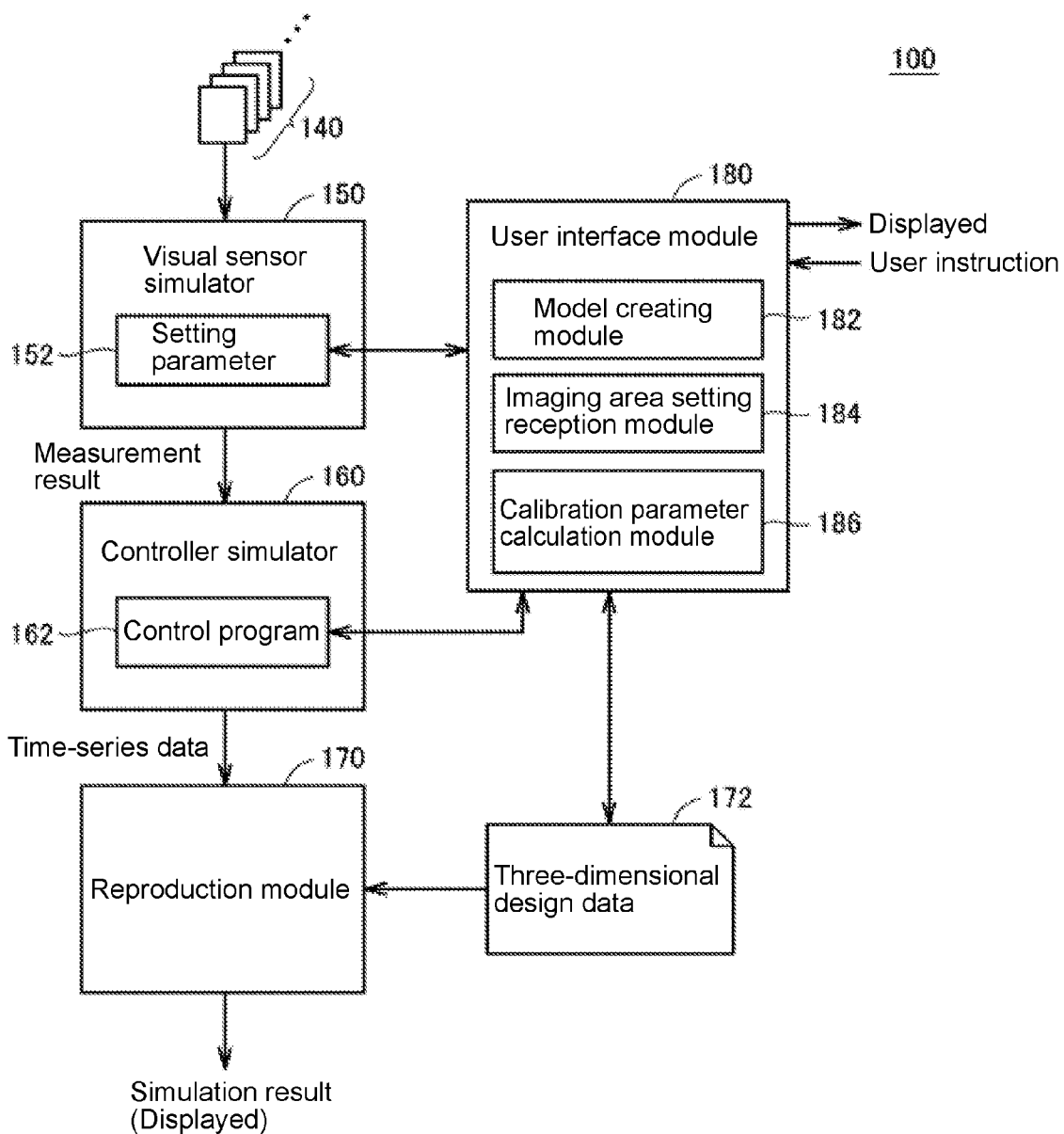
FIG. 5 is a schematic diagram showing the functional structure of the simulator according to the embodiment.

FIG. 5 is a schematic diagram showing the functional structure of the simulator according to the present embodiment. The simulator 100 shown in FIG. 5 includes a visual sensor simulator 150, a controller simulator 160, a reproduction module 170, and a user interface module 180 as software functions. This group of functional modules is typically implemented by the processor 102 executing the simulation program 124 (refer to FIG. 4).

The visual sensor simulator 150 performs image measurement of the preliminarily obtained image data to be performed using the visual sensor 220 (refer to FIGS. 1 to 3), and outputs the measurement results. In other words, the visual sensor simulator 150 is a module for simulating the processing performed by the visual sensor 220, and performs various image measurements of the preliminarily obtained image data group 140. The image measurement in the visual sensor simulator 150 is performed in accordance with a predetermined setting parameter 152. The measurement results from the image measurement performed by the visual sensor simulator 150 are output to the controller simulator 160. The output processing corresponds to the transmission of the measurement results obtained by the visual sensor 220 to the controller 200 through the network 202 in the manufacturing system shown in FIGS. 1 to 3.

The controller simulator 160 is a module that simulates the processing performed in the controller 200 (refer to FIGS. 1 to 3), and executes a control operation (a sequence instruction, a motion instruction, or various functional instructions) in accordance with a preliminary created control program 162. Data input and output associated with the control operation performed in the controller simulator 160 is output to a reproduction module 170 as time-series data.

The reproduction module 170 reproduces the behavior of a created system using the time-series data for the control operation output from the controller simulator 160. More specifically, the reproduction module 170 uses three-dimensional design data 172, which is a definition file, to visualize the system created virtually within a three-dimensional virtual space, and also uses the time-series data provided from the controller simulator 160 to reproduce the chronological changes of the workpiece or the robot in the system. The reproduction module 170 thus reproduces the chronological changes of the simulation results in the form of animation or a moving image on a display unit 108 of the simulator 100 (FIG. 4).

The user interface module 180 provides an operation screen for aiding the user to set and create the setting parameter 152, the control program 162, and the three-dimensional design data 172. The user interface module 180 also provides any user interface used when the reproduction module 170 displays simulation results.

More specifically, the user interface module 180 includes a model creating module 182, an imaging area setting reception module 184, and a calibration parameter calculation module 186.

The model creating module 182 virtually creates the system to be simulated in a three-dimensional virtual space. More specifically, the model creating module 182 displays a three-dimensional virtual space, and provides a setting and operation screen for creating the system to be simulated in the three-dimensional virtual space.

The imaging area setting reception module 184 receives the setting of the imaging area defined for the visual sensor 220 in a manner associated with the created system. More specifically, the imaging area setting reception module 184 determines the range of the imaging area in response to a user operation for the system to be simulated appearing in the three-dimensional virtual space. The imaging area may be superimposed on the system to be simulated.

The calibration parameter calculation module 186 calculates transform parameters for transforming the measurement results from the visual sensor simulator 150 into input values for a control operation executed in the controller simulator 160 based on the relative positional relationship between the created system and the set imaging area. The controller simulator 160 receives the results obtained by transforming the measurement results generated by the visual sensor simulator 150 and performs the control operation in accordance with the control program associated with the system.

Although FIG. 5 shows the example in which the reproduction module 170 reproduces the behavior of the created system using the time-series data output from the controller simulator 160, the simulator 100 may not include the reproduction module 170. For example, the time-series data output from the controller simulator 160 may be output to an external device or an external application, and the external device or the external application may reproduce the behavior of the system. In some embodiments, the reproduction module 170 may simply generate and store moving image data for reproducing the system behavior in any storage medium, which may then be reproduced by another application.

c2: Modifications

Figure 6:
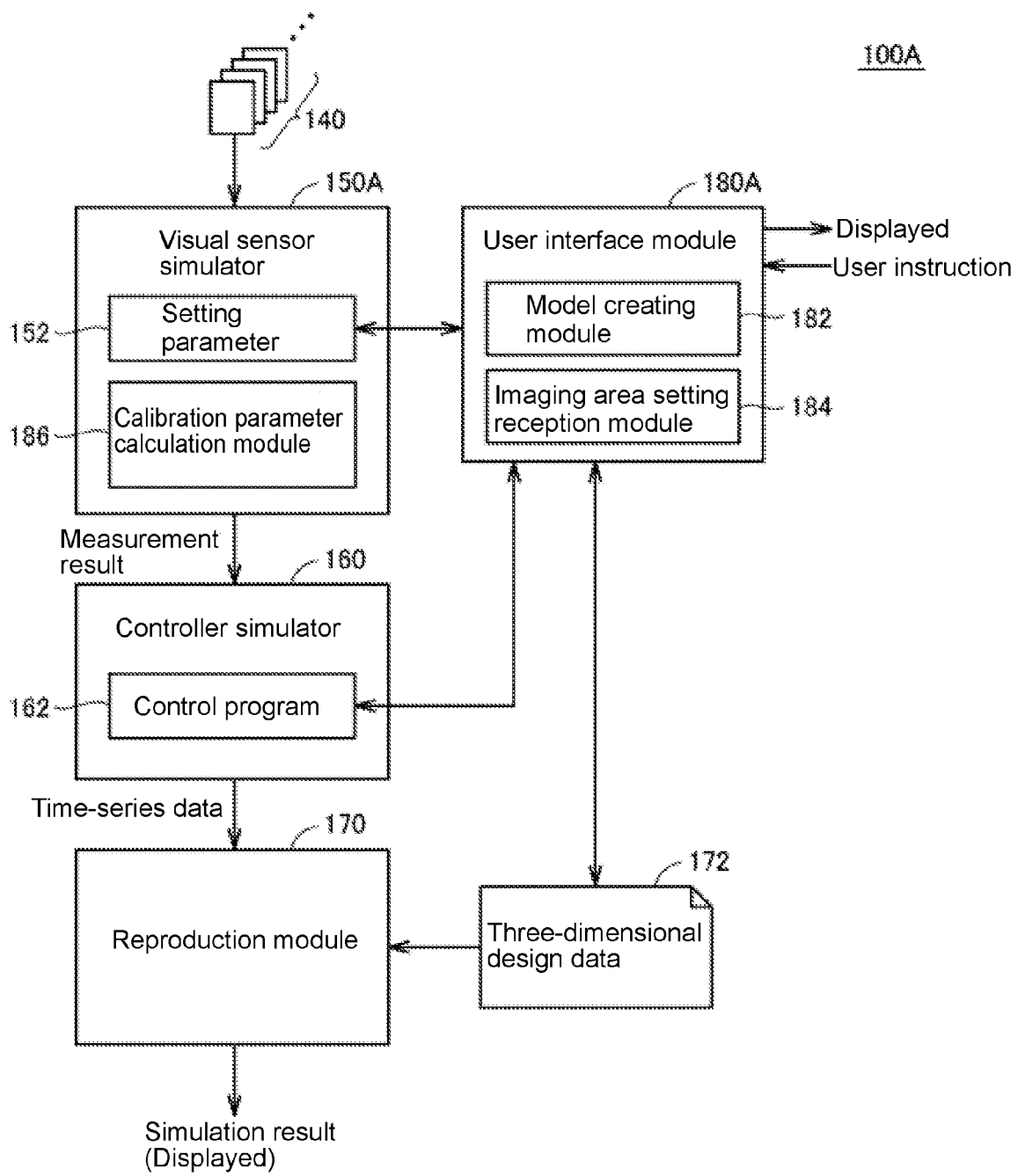
FIG. 6 is a schematic diagram showing the functional structure of the simulator according to the embodiment.

FIG. 6 is a schematic diagram showing the functional structure of a simulator according to a modification of the present embodiment. With reference to FIG. 6, the simulator 100A includes a visual sensor simulator 150A, a controller simulator 160, a reproduction module 170, and a user interface module 180A as software functions. Unlike the simulator 100 shown in FIG. 5, the calibration parameter calculation module 186 in this modification is included in the visual sensor simulator 150A, instead of being included in the user interface module 180A. The other components of this modification are the same as in the above embodiment, and will not be described in detail redundantly.

As shown in FIG. 5 and FIG. 6, the calibration parameter calculation module 186 is a functional module that calculates transform parameters for transforming the measurement results from the visual sensor simulator 150 into input values for a control operation executed in the controller simulator 160. The calibration parameter calculation module 186 may be implemented as a part of any functional module or may be implemented as an independent functional module.

D. Procedure

The procedure of simulation performed by the simulator 100 according to the present embodiment will now be described.

Figure 7:
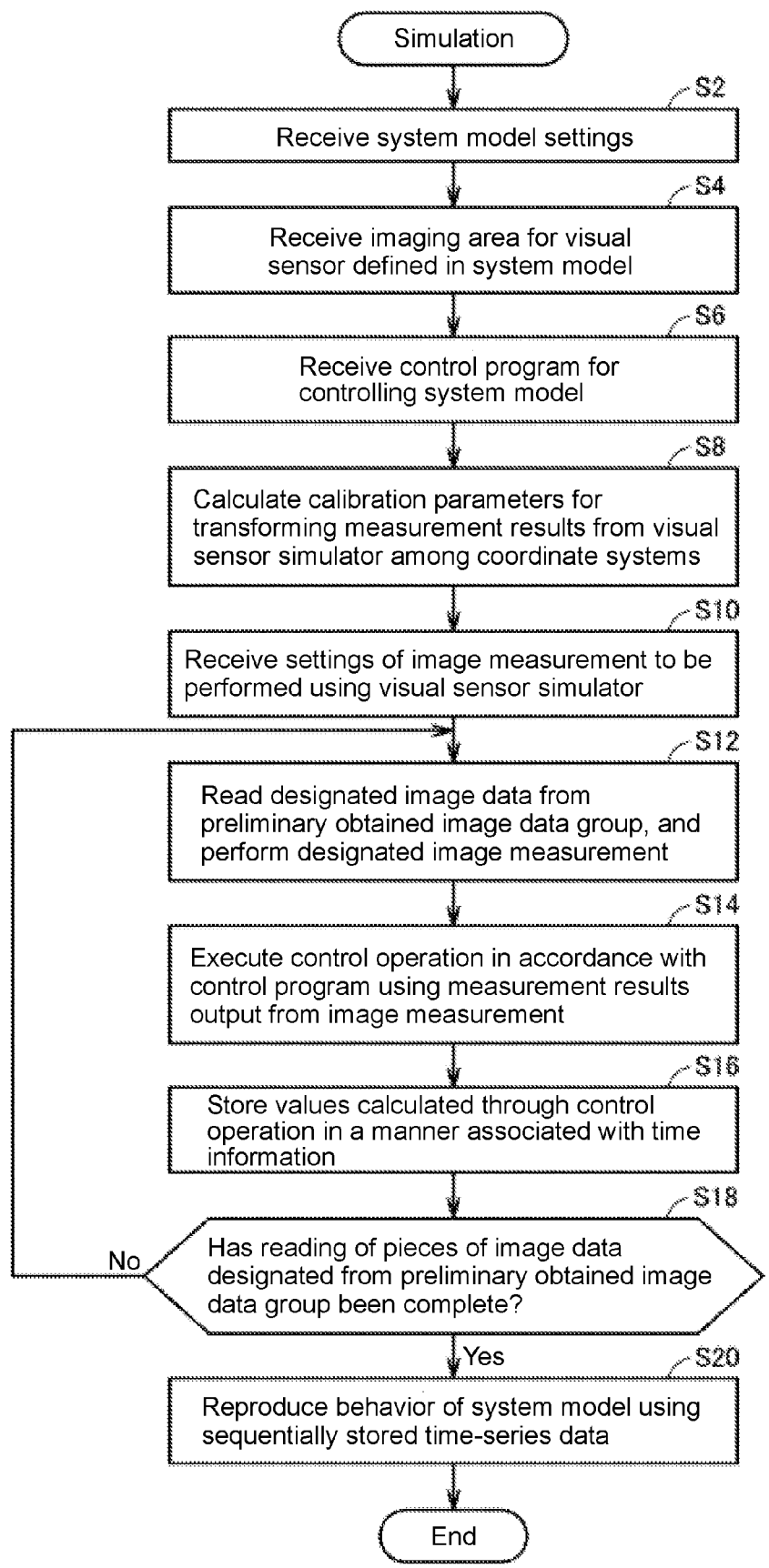
FIG. 7 is a flowchart showing the procedure of simulation performed by the simulator according to the embodiment.

FIG. 7 is a flowchart showing the procedure of simulation performed by the simulator 100 according to the present embodiment. With reference to FIG. 7, the simulator 100 first receives the settings of the system model (step S2). The settings of the system model include the arrangement of the devices included in the system and the operational speed of each device. Based on these system model settings, the simulator 100 virtually creates a system to be simulated in a three-dimensional virtual space.

The simulator 100 receives the imaging area defined for the visual sensor in the system model (step S4). In other words, the simulator 100 receives the settings of the imaging area defined for the visual sensor in a manner associated with the created system.

The simulator 100 receives a control program for controlling the system model (step S6). This control program is associated with the system, and is to be executed by the controller simulator 160.

Subsequently, the simulator 100 calculates calibration parameters, which are transform parameters for transforming the measurement results into input values for a control operation based on the relative positional relationship between the created system and the set imaging area. More specifically, the simulator 100 calculates calibration parameters for transforming the measurement results from the visual sensor simulator 150 based on the range of the set imaging area, among the coordinate system defined for the visual sensor simulator 150, the coordinate system defined for the conveyor in the system model, and the coordinate system defined for the robot in the system model (step S8).

The simulator 100 receives the detailed settings of the image measurement to be performed using the visual sensor simulator 150 (step S10).

This processing completes the settings for the simulation.

When instructed to start the simulation, the simulator 100 (visual sensor simulator 150 in FIG. 5) reads designated image data from the preliminary obtained image data group 140, and performs image measurement designated for the visual sensor 220 (step S12). The simulator 100 (controller simulator 160 in FIG. 5) then executes the control operation in accordance with the control program using the measurement results output from the image measurement (step S14). More specifically, the simulator 100 executes the control operation in accordance with the control program associated with the system using the input results obtained by transforming the measurement results into calibration parameters (transform parameters).

The simulator 100 stores values calculated through the control operation in a manner associated with time information (step S16). The simulator 100 determines whether reading of pieces of image data designated from the preliminary obtained image data group 140 has been complete (step S18). When reading of the designated pieces of image data has not been complete (No in step S18), the processing in step S12 and subsequent steps is repeated.

When reading of the designated pieces of image data has been complete (Yes in step S18), the simulator 100 reproduces the behavior of the system model using the time-series data stored sequentially in step S16 (step S20). The simulator 100 may change the time interval and the update interval of the behavior of the reproduced system model as appropriate in response to a user operation.

With the above procedure, the tact time or the performance of the system model can be evaluated.

When the preliminary obtained image data group 140 has an insufficiently long duration or an insufficient number of frames to perform the simulation, the image data group 140 may be input repeatedly. In step S18, the image data may be input repeatedly from the beginning part after reading of the designated pieces of image data is complete. The simulation may then be stopped when the simulation for the preset time or for the preset number of frames is complete. In other words, the simulation may be stopped when satisfying any predefined condition other than the condition that reading of the pieces of image data is complete.

E. System Model Creation

A process for creating the system model to be simulated will now be described. The process for creating the system model is typically performed by the model construction module 182 (FIG. 5), and corresponds to the reception of the setting of the system model shown in FIG. 7 described above (step S2).

A user may directly create the system model to be simulated on an edit screen provided by the simulator 100, or may load preliminary generated design data (e.g., computer aided design (CAD) data) into the simulator to create the system model. When data for the system model generated in the past can be used, the user may edit the past data and use it to create the system model.

The simulator 100 according to the present embodiment may use any method to create the model system.

Figure 8:
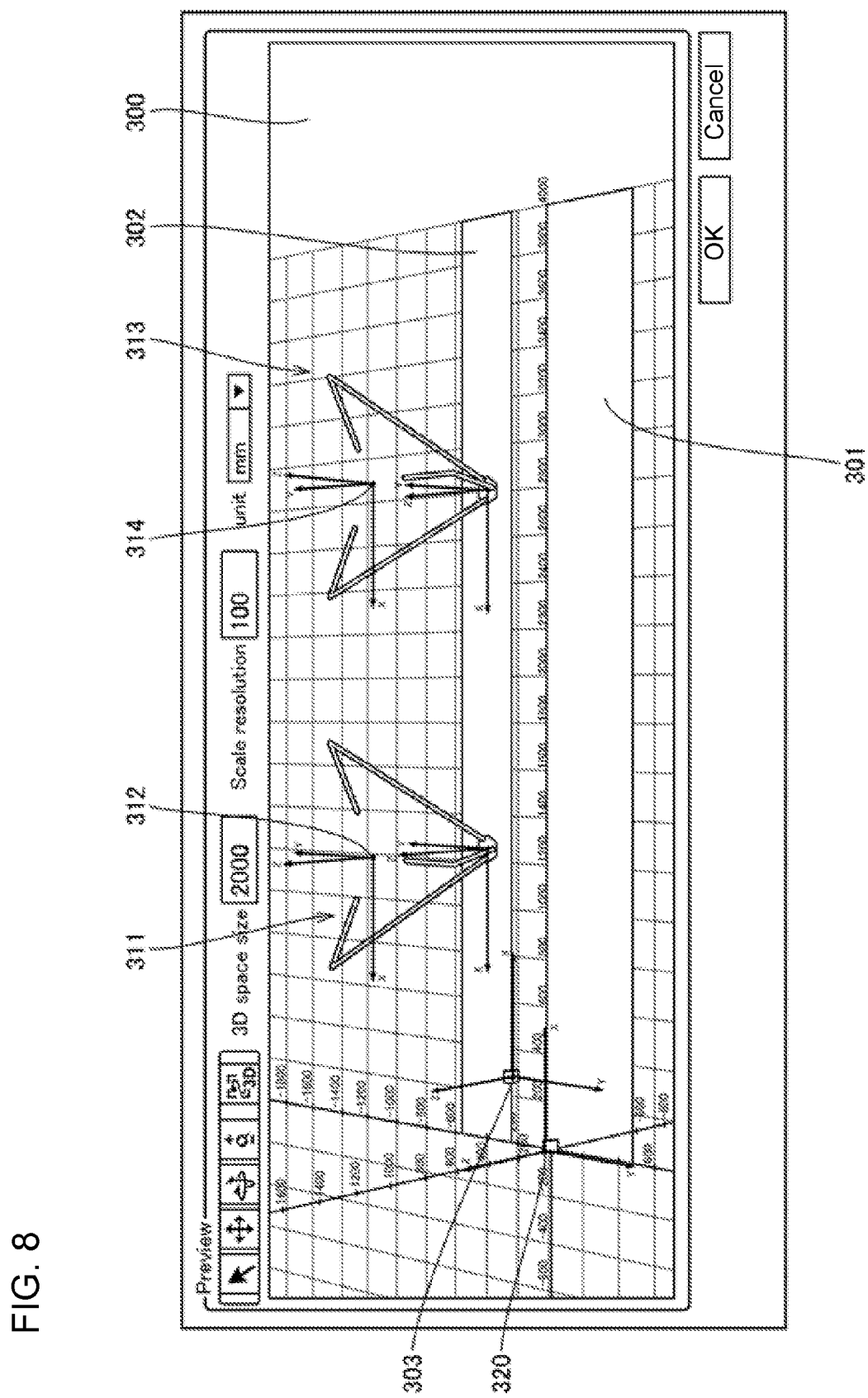
FIG. 8 is a diagram showing an example user interface screen for creating a system model provided by the simulator according to the embodiment.

FIG. 8 is a diagram showing an example user interface screen for creating the system model provided by the simulator 100 according to the present embodiment. For ease of explanation, FIG. 8 shows a system model that performs a simple pick-and-place operation.

More specifically, the user interface screen shown in FIG. 8 shows two conveyors 301 and 302 arranged parallel to each other in a three-dimensional virtual space 300. Two robots 311 and 313 are arranged in correspondence with predetermined positions on the conveyor 302. This system model is used for an application in which workpieces are transported by the conveyor 301 from left to right in the drawing, and the robots 311 and 313 each pick up a target workpiece and place the workpiece on the conveyor 302. As described above, the system model shown in FIG. 8 includes the conveyors and the robots. The robots operate in accordance with the results of a control operation executed in the controller simulator 160.

In the user interface screen shown in FIG. 8, an object in the three-dimensional virtual space 300 can be rendered in any direction. More specifically, a user can freely change a point of view for rendering in the user interface screen.

Figure 9:
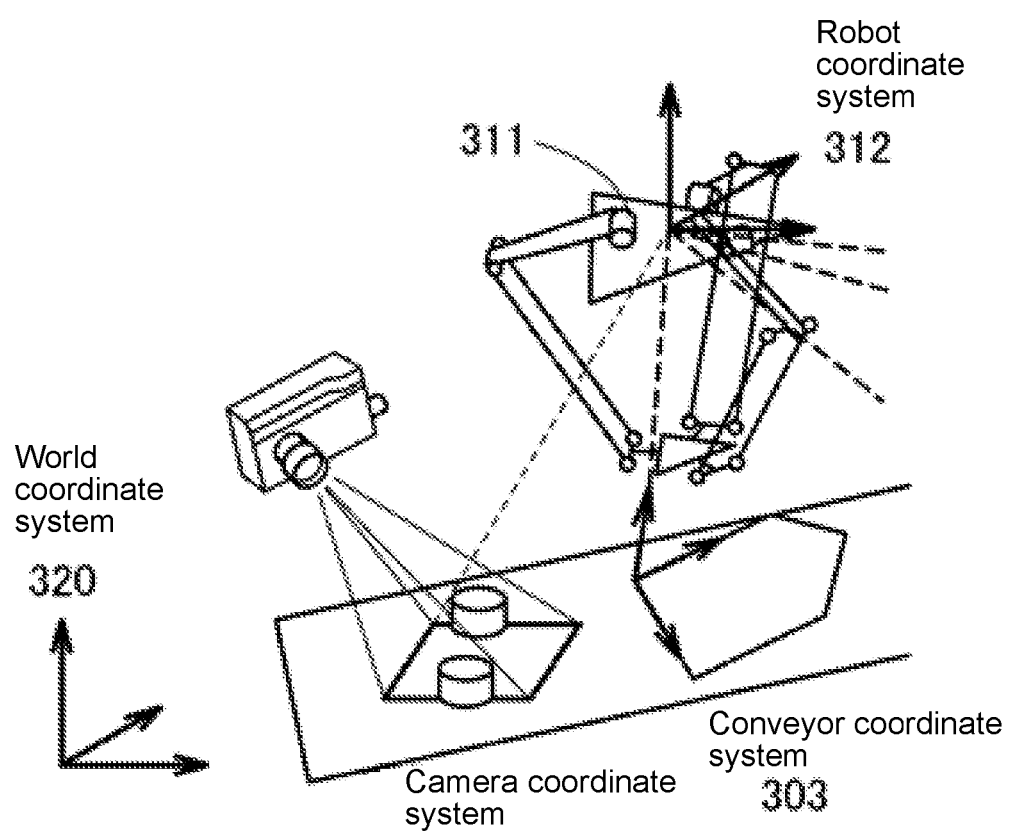
FIG. 9 is a schematic diagram describing the coordinate systems defined in a three-dimensional virtual space provided by the simulator according to the embodiment.

The coordinate systems used in the system model shown in FIG. 8 will now be described. FIG. 9 is a schematic diagram describing the coordinate systems defined in the three-dimensional virtual space provided by the simulator 100 according to the present embodiment.

With reference to FIG. 9, the three-dimensional virtual space 300 includes X, Y, and Z axes defining a world coordinate system 320. The world coordinate system 320 serves as a reference coordinate system for defining the positions of components of the system model.

To allow tracking of a workpiece transported on the conveyors 301 and 302, the controller (controller simulator 160 in FIG. 5) uses a conveyor coordinate system 303, which includes the initial position of each of the conveyors 301 and 302 as the origin. The conveyor coordinate system 303 is a coordinate system defined for a conveyor included in the system model. The conveyor coordinate system 303 includes three axes in three directions, which are the transport direction of the conveyors 301 and 302, the direction orthogonal to the transport direction, and the direction orthogonal to the transporting surfaces of the conveyors 301 and 302.

The robots 311 and 313 may have robot coordinate systems 312 and 314, which are defined independently of each other for controlling the corresponding robots. The robot coordinate systems 312 and 314 are defined for the robots 311 and 313 in the system model, and have the centers of stationary frames of the robots 311 and 313 as their origins. The robot coordinate systems 312 and 314 are used to control the behavior of the robots 311 and 313 as viewed from a robot controller.

When the robots 311 and 313 have pickup jigs mounted on their ends, tool coordinate systems having the ends of the robots 311 and 313 as their origins may further be defined.

F. Setting Imaging Area and Calculating Calibration Parameters

The imaging area set in the system model and the calibration parameters calculated in accordance with the imaging area will now be described. To link the image data group 140 obtained by actually capturing images with the simulation using the system model, the simulator 100 according to the present embodiment is capable of automatically calculating calibration parameters as appropriate based on the imaging area set for the system model.

For the simulator 100 according to the present embodiment, the user can simply set the imaging area, which is used by the imaging unit 222 to capture image data to be input into the visual sensor, in the created system model. The simulator 100 may not be capable of automatically calculating calibration parameters. The setting may be performed by a device other than the simulator 100 or by the user.

f1: Setting Imaging Area

Figure 10:
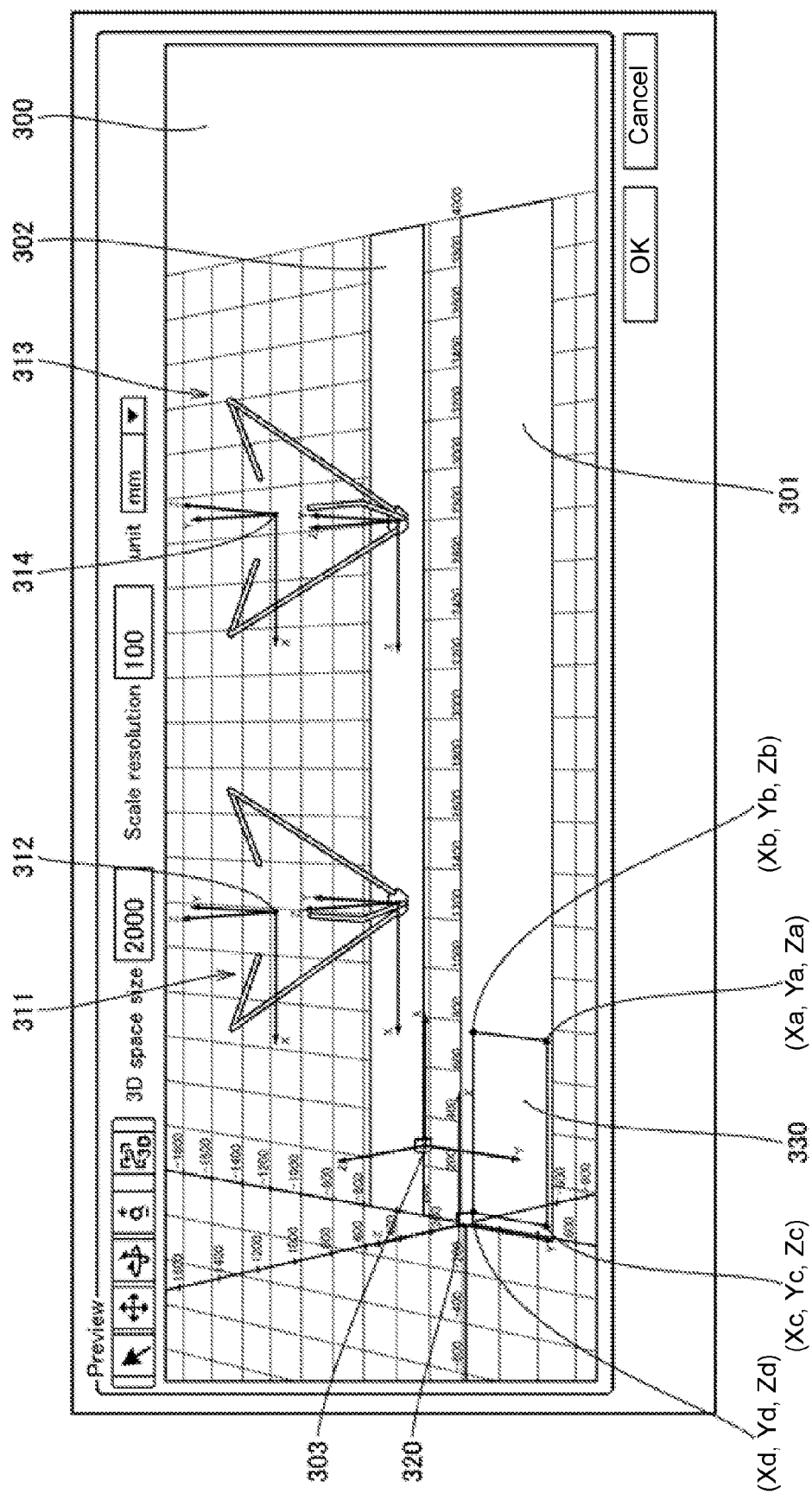
FIG. 10 is a diagram showing an example user interface screen for setting an imaging area in the system model provided by the simulator according to the embodiment.

FIG. 10 is a diagram showing an example user interface screen for setting an imaging area in the system model provided by the simulator 100 according to the present embodiment. With reference to FIG. 10, the user sets an imaging area 330 in the created system model by performing a mouse operation. The vertices of the imaging area 330 are at the coordinates (Xa, Ya, Za), (Xb, Yb, Zb), (Xc, Yc, Zc), and (Xd, Yd, Zd).

Figure 11:
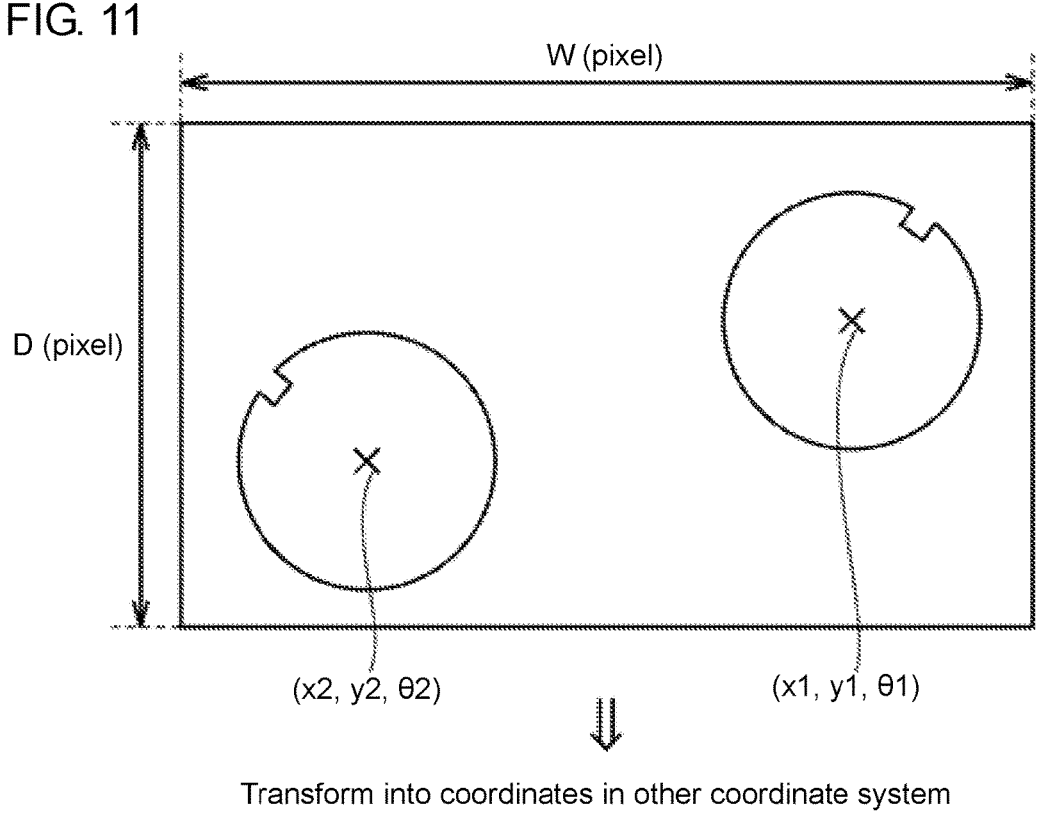
FIG. 11 is a diagram describing the measurement results obtained by a visual sensor simulator included in the simulator according to the embodiment.

FIG. 11 is a diagram describing the measurement results obtained by the visual sensor simulator 150 included in the simulator 100 according to the present embodiment. With reference to FIG. 11, the visual sensor simulator 150, which simulates the visual sensor 220, performs image measurement of image data including a plurality of pixels, and thus yields measurement results defined using the pixel values. FIG. 11 shows the results of pattern matching with any pre-registered image patterns. The image data includes two objects matching pre-registered image patterns. The output measurement results are the values (x1, y1, θ1) and (x2, y2, θ2). The measurement results include the positions of objects matching the pre-registered image patterns (both defined by pixel values), and the rotation angles (attitude) with respect to the pre-registered image patterns.

To fit these measurement results output as the coordinates included in the image data to the system model created in the three-dimensional virtual space, the simulator 100 according to the present embodiment transforms these coordinates into the values in another coordinate system using the calibration parameters.

In the example described below, a coordinate system that defines the coordinates in the image data shown in FIG. 11 is referred to as a camera coordinate system. The values in the camera coordinate system may be transformed into values in either one of two coordinate systems (a world coordinate system or a robot coordinate system) through simulation. In the typical example described below, the values in the camera coordinate system are transformed into the values in the robot coordinate system. More specifically, in the example described below, the robot coordinate system is designated as a reference coordinate system, and the values in the camera coordinate system are transformed into the values in the robot coordinate system. The position and the attitude of a workpiece are then calculated using the robot coordinate system.

In the simulator 100 according to the present embodiment, the calibration parameters include coefficients A to F described below. The coefficients A to F correspond to transform parameters for transforming the measurement results from the visual sensor simulator 150 into input values for a control operation in the controller simulator 160. In other words, the transform parameters (coefficients A to F) are parameters used for transforming the coordinates in the camera coordinate system output as the measurement results into the coordinates in the reference coordinate system (robot coordinate system) defining the behavior of the robot.

The coordinates (X, Y) in the robot coordinate system are calculated from the coordinates (x, y) in the camera coordinate system using the transform formulas described below. A typical visual sensor cannot detect the height direction (Z-direction). Thus, the camera coordinate system may not include the Z axis.

$$X = A \cdot x + B \cdot y + C$$

$$Y = D \cdot x + E \cdot y + F$$

As described above, the simulator 100 according to the present embodiment calculates the transform parameters based on the relative positional relationship between the system constructed in the three-dimensional virtual space and the set imaging area.

f2: Calculating Coefficients A to F

Among the calibration parameters, the coefficients A to F are parameters used for transforming from the camera coordinate system to the reference coordinate system. The coefficients A to F are calculated based on information about the camera coordinate system and the reference coordinate system defined in the three-dimensional virtual space.

Figure 12:
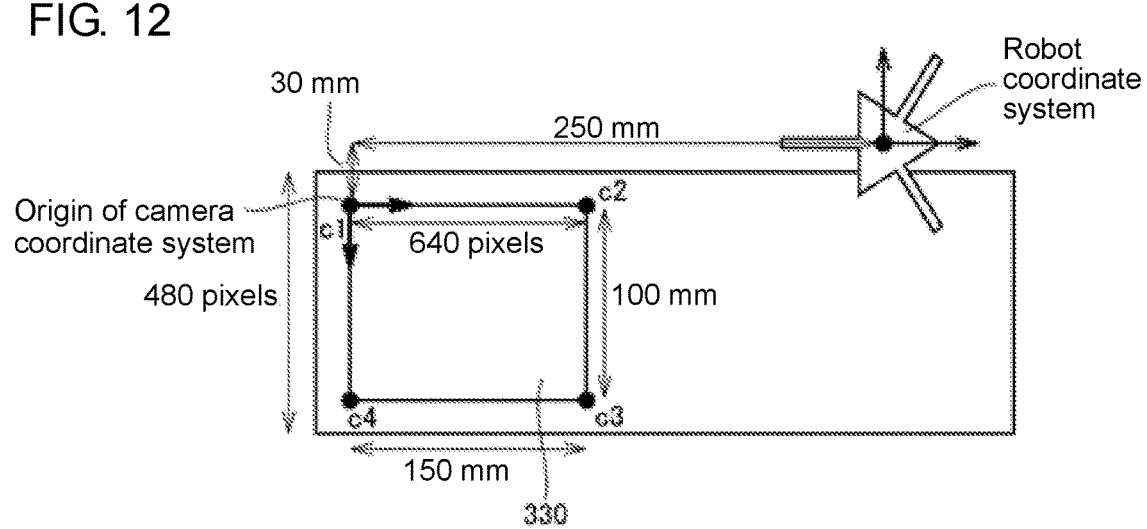
FIG. 12 is a schematic diagram showing an example relationship between a camera coordinate system for an imaging area and a reference coordinate system defined in the three-dimensional virtual space provided by the simulator according to the embodiment.

FIG. 12 is a schematic diagram showing an example relationship between the camera coordinate system for the imaging area and the reference coordinate system defined in the three-dimensional virtual space provided by the simulator 100 according to the present embodiment.

With reference to FIG. 12, the imaging area 330 has vertices c1, c2, c3, and c4, for which two sets of coordinates, namely, the coordinates in the camera coordinate system and the coordinates in the reference coordinate system, are calculated. In the example shown in FIG. 12, the coordinates of the vertices c1, c2, c3, and c4 in the camera coordinate system are calculated in the manner described below. The coordinates are defined in pixels.

$$c1 = (0, 0)$$

$$c2 = (640, 0)$$

$$c3=(640,480)$$

$$c4=(0,480)$$

In the reference coordinate system (robot coordinate system), the coordinates are calculated in the manner described below. The coordinates are defined in millimeters.

$$c1=(-250,-30)$$

$$c2=(-100,-30)$$

$$c3=(-100,-130)$$

$$c4=(-250,-130)$$

For these four points at the same absolute coordinates, coefficients A to F, which are transform parameters for transforming the coordinates, are calculated by calculating the coordinates from each of the two coordinate systems with the procedure described below.

The three-dimensional virtual space provided by the simulator 100 according to the present embodiment is defined in the world coordinate system. The coordinates in the camera coordinate system and the coordinates in the reference coordinate system (robot coordinate system) are first transformed into the coordinates in the world coordinate system. The resultant coordinates are then used to calculate the coefficients A to F, which are calibration parameters.

The parameters for transforming from one set of coordinates to another set between the two coordinate systems may be calculated with any method instead of using the procedure described below.

Figure 13:
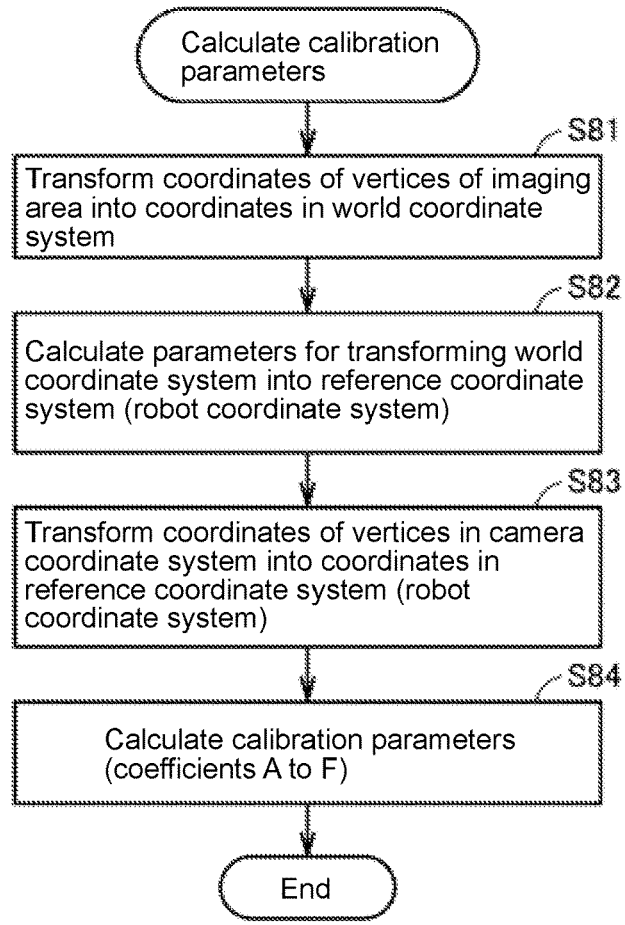
FIG. 13 is a flowchart showing the procedure for calculating calibration parameters in the simulator according to the embodiment.

FIG. 13 is a flowchart showing the procedure for calculating the calibration parameters in the simulator 100 according to the present embodiment. With reference to FIG. 13, the simulator 100 transforms the coordinates of the vertices of the imaging area 330 into the coordinates in the world coordinate system (step S81). Subsequently, the simulator 100 calculates parameters for transforming the world coordinate system into the reference coordinate system (robot coordinate system) (step S82). Using the parameters calculated in step S82, the simulator 100 transforms the coordinates of the vertices in the camera coordinate system for the imaging area 330 into the coordinates in the reference coordinate system (robot coordinate system) (step S83).

Finally, the simulator 100 calculates the calibration parameters (coefficients A to F) (step S84).

The processing in each step in FIG. 13 will now be described in detail.

(1) Transforming the coordinates of the vertices of the imaging area 330 into the coordinates in the world coordinate system (step S81)

Figure 14:
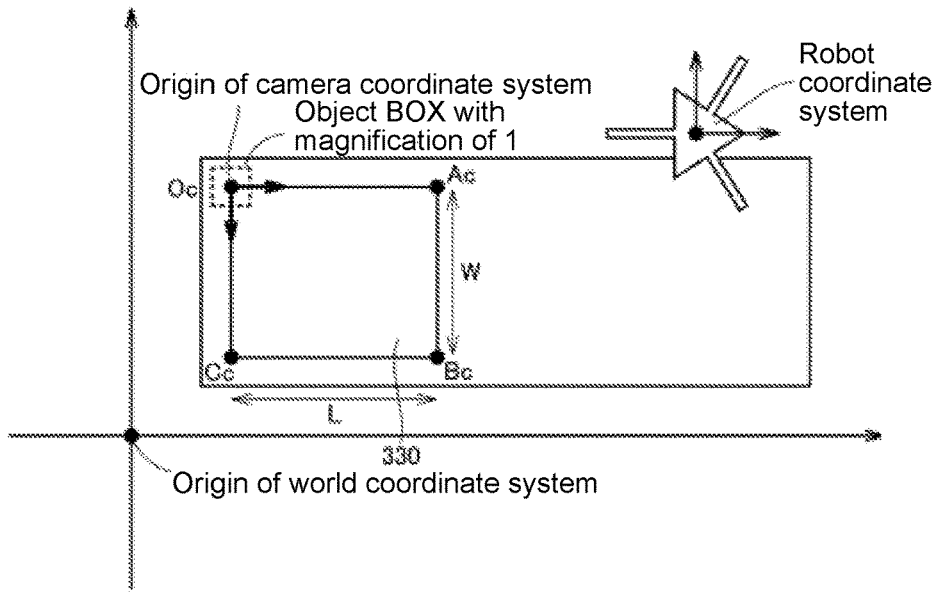
FIG. 14 is a schematic diagram describing the processing in step S81 included in the procedure for calculating calibration parameters shown in FIG. 13.

FIG. 14 is a schematic diagram describing the processing in step S81 included in the procedure for calculating calibration parameters shown in FIG. 13. With reference to FIG. 14, an object BOX with a magnification of 1 is set at the same position and the same angle as the origin of the imaging area 330. Subsequently, any four points located with respect to the camera origin are selected.

The vertices Oc, Ac, Bc, and Cc of the imaging area 330 will be used. The imaging area 330 has a length of L and a width of W. In this case, the local coordinates of the vertices Oc, Ac, Bc, and Cc for the object BOX are calculated in the manner described below.

$$Oc=(0,0,0)$$

$$Ac=(L,0,0)$$

$$Bc=(L,W,0)$$

$$Cc=(0,W,0)$$

The vertex Oc is aligned with the coordinate center of the object BOX with a magnification of 1. When the object BOX with a magnification of 1 is at the same coordinates as in the camera coordinates system, the coordinates of the vertices Oc, Ac, Bc, and Cc in the world coordinate system may be calculated using a rotation matrix and a translation matrix of the object BOX.

More specifically, the coordinates of the vertices Oc, Ac, Bc, and Cc in the world coordinate system are WOc, WAc, WBc, and WCc. In this case, the coordinates of these vertices are calculated in the manner described below. In the formulas below, R is the rotation matrix of the object BOX with a magnification of 1, and M is the translation matrix of the object BOX.

$$WOc=R\times Oc+M$$

$$WAc=R\times Ac+M$$

$$WBc=R\times Bc+M$$

$$WCc=R\times Cc+M$$

(2) Calculating parameters for transforming the world coordinate system into the reference coordinate system (robot coordinate system) (step S82)

The parameters for transforming the coordinates WOc, WAc, WBc, and WCc calculated in step S81 described above into the coordinates in the reference coordinate system (robot coordinate system) are calculated.

Figure 15:
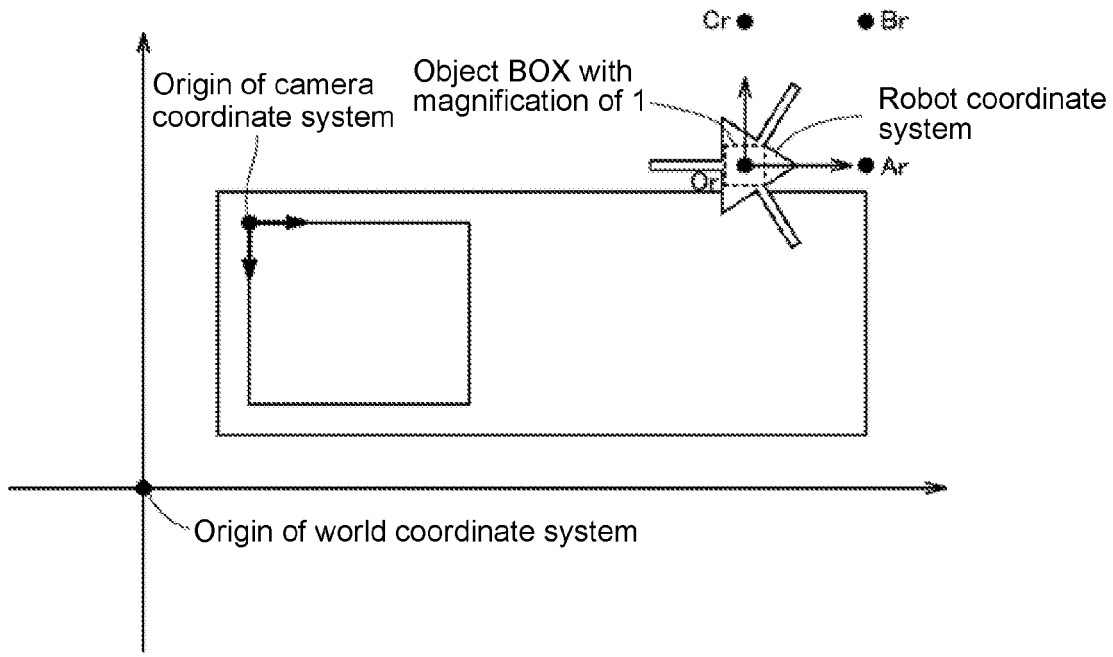
FIG. 15 is a schematic diagram describing the processing in step S82 included in the procedure for calculating calibration parameters shown in FIG. 13.

FIG. 15 is a schematic diagram describing the processing in step S82 included in the procedure for calculating calibration parameters shown in FIG. 13. With reference to FIG. 15, as in the processing (1) described above, the object BOX with a magnification of 1 is set in the coordinate system identical to the reference coordinate system (robot coordinate system), and any four points are selected.

The points Or, Ar, Br, and Cr in FIG. 15 are the selected four points in the imaging area. The point Or is aligned with the center coordinate of the object BOX with a magnification of 1. When the object BOX with a magnification of 1 is defined in the coordinate system identical to the reference coordinate system (robot coordinate system), the coordinates of the points Or, Ar, Br, and Cr in the world coordinate system may be calculated from the rotation matrix and the translation matrix of the object BOX.

More specifically, the coordinates of the points Or, Ar, Br, and Cr in the world coordinate system are WOr, WAr, WBr, and WCr. In this case, the coordinates of these points are calculated in the manner described below. In the formulas below, R is the rotation matrix of the object BOX with a magnification of 1, and M is the translation matrix of the object BOX.

$$WOr=R\times Or+M$$

$$WAr=R\times Ar+M$$

$$WBr=R\times Br+M$$

$$WCr=R\times Cr+M$$

The above calculation processes (1) and (2) yield the coordinates of the points Or, Ar, Br, and Cr viewed in the reference coordinate system (robot coordinate system) and the coordinates of these points viewed from the origin of the world coordinate system. These coordinates can be used to calculate parameters for transforming the coordinates from the world coordinate system to the reference coordinate system (robot coordinate system). More specifically, the coefficients a, b, c, d, e, and f that satisfy the transform formulas described below can be calculated.

(X in reference coordinate system)=(X in world coordinate system)×a+(Y in world coordinate system)×b+c (Y in reference coordinate system)=(Y in world coordinate system)×d+(Y in world coordinate system)×e+f (3) Transforming the coordinates of the vertices in the camera coordinate system into the coordinates in the reference coordinate system (robot coordinate system) (step 83).

The coefficients a to f yielded from the above calculation process (2) are used to transform the coordinates WOc, WAc, WBc, and WCc into the coordinates MOc, MAc, MBc, and MCc in the reference coordinate system (robot coordinate system).

(4) Calculating calibration parameters (coefficients A to F) (step S84).

The coordinates of the vertices Oc, Ac, Bc, and Cc in the camera coordinate system are COc, CAc, CBc, and CCc. In this case, these coordinates are calculated in the manner described below. In the formulas below, CV is a vertical resolution of a captured image, and CH is a horizontal resolution of the captured image. The resolutions are set by a user.

$COc=(0,0,0)$ $CAc=(CH,0,0)$ $CBc=(CH,CV,0)$ $CCc=(0,CV,0)$

These four coordinates, and the coordinates MOc, MAc, MBc, and MCc in the reference coordinate system (robot coordinate system) are used to calculate the calibration parameters (coefficients A to F). More specifically, the coefficients A, B, C, D, E, and F that satisfy the transform formulas described below can be calculated.

(X in reference coordinate system)=(X in camera coordinate system)×A+(Y in camera coordinate system)×B+C (Y in reference coordinate system)=(X in camera coordinate system)×D+(Y in camera coordinate system)×E+F The coefficients A to F yielded from the above calculation process are then output as calibration parameters.

f3: Calculating Movement Per Pulse

The calibration parameters may include a transform coefficient for transforming the unit movement of a device (conveyor 230) that transports a workpiece in the created system into the moving speed of the workpiece in the created system, in addition to the coefficients A to F described above. This transform coefficient includes a movement in X-direction of a workpiece and a movement in Y-direction of the workpiece in correspondence with a unit movement of the conveyor 230 (typically, a movement per pulse from the encoder 236).

These movements are used to calculate chronological changes of the workpiece when the behavior of the created system is reproduced. In other words, the movement per pulse included in the calibration parameter is used to calculate the position of the workpiece at each timing based on the encoder value provided from the encoder 236. The simulator 100 according to the present embodiment calculates the movement per pulse using the tilting of the conveyor with respect to the reference coordinate system (robot coordinate system) and the transform coefficient for calculating the movement.

Figure 16:
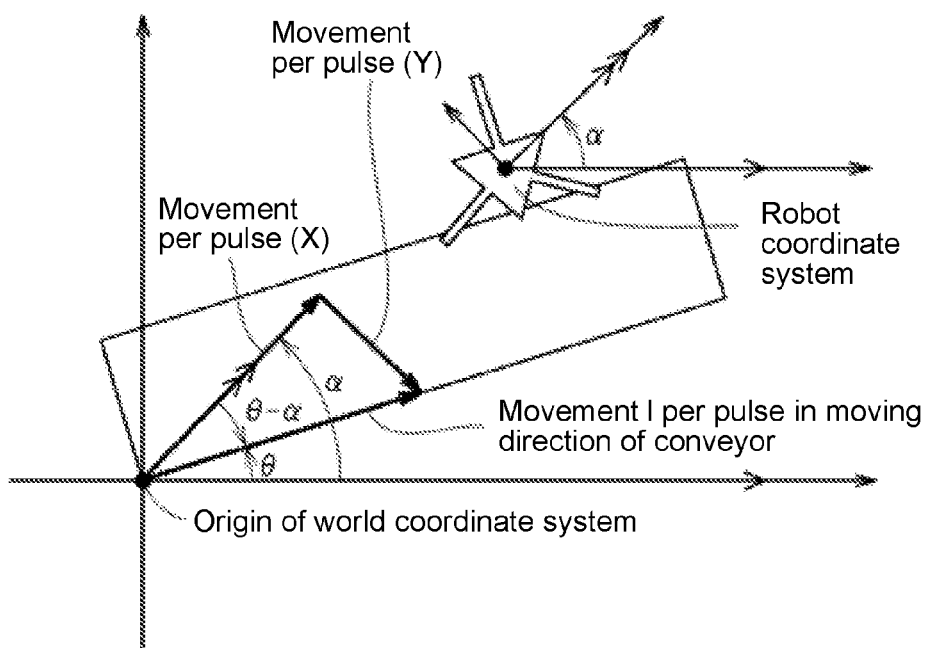
FIG. 16 is a schematic diagram describing the procedure for calculating a movement per pulse in the simulator according to the embodiment.

FIG. 16 is a schematic diagram describing the procedure for calculating the movement per pulse in the simulator 100 according to the present embodiment. In FIG. 16, the conveyor and the robot are rotated about the Z axis of the world coordinate system. When the conveyor rotates about the Z axis by a rotation angle θ and the robot rotates about the Z axis by a rotation angle α, the movement per pulse is calculated in the manner described below. In the formulas below, I is the movement per pulse in the moving direction of the conveyor.

Movement(X) in X-direction per pulse=$I \times \cos(\theta-\alpha)$

Movement(Y) in Y-direction per pulse=$I \times \sin(\theta-\alpha)$

As described above, the movement per pulse may be calculated by applying (θ−α) to the movement per pulse in the moving direction of the conveyor.

FIG. 16 shows the example in which the conveyor and the robot are rotated about the Z axis of the world coordinate system for ease of explanation. In the actual system model, the conveyor and the robot may be rotated about the X axis and the Y axis in addition to the Z axis. The calculation described below thus reflects the rotation angle for each axis.

For a typical actual system model, for example, the conveyor is tilted by a rotation angle θx about the X axis, by a rotation angle θy about the Y axis, and by a rotation angle θz about the Z axis of the world coordinate system. The robot is tilted by a rotation angle αx about the X axis, by a rotation angle αy about the Y axis, and by a rotation angle αz about the Z axis of the world coordinate system.

A unit matrix of 3×3 is rotated by an angle (θx−αx) about the X axis, by an angle (θy−αy) about the Y axis, and by an angle (θz−αz) about the Z axis. This generates a rotation matrix.

The movement I per pulse in the moving direction of the conveyor may be obtained from the initial setting value. Thus, the coordinates X and Y calculated by multiplying the rotation matrix and the local coordinate axis (I, 0, 0) of the system model correspond to the movement (X) in X-direction per pulse and the movement (Y) in Y-direction per pulse as described below. The values indicating the movement are in millimeters.

Movement$(x,y,z)$=rotation matrix×$(I,0,0)$

Movement(X) in X-direction per pulse=movement($x$) (mm)

Movement(Y) in Y-direction per pulse=movement($y$) (mm)

The movement (X) in X-direction per pulse and the movement (Y) in Y-direction per pulse, which are yielded from the above calculation process, are calculated as calibration parameters.

G. Displaying Simulation Results

The process for displaying the simulation results will now be described. The process for displaying the simulation results, or the process for reproducing the behavior of the system model, is typically performed by the reproduction module 170 (FIG. 5), and corresponds to the reception of the system model settings (step S20) shown in FIG. 7 described above.

Figure 17:
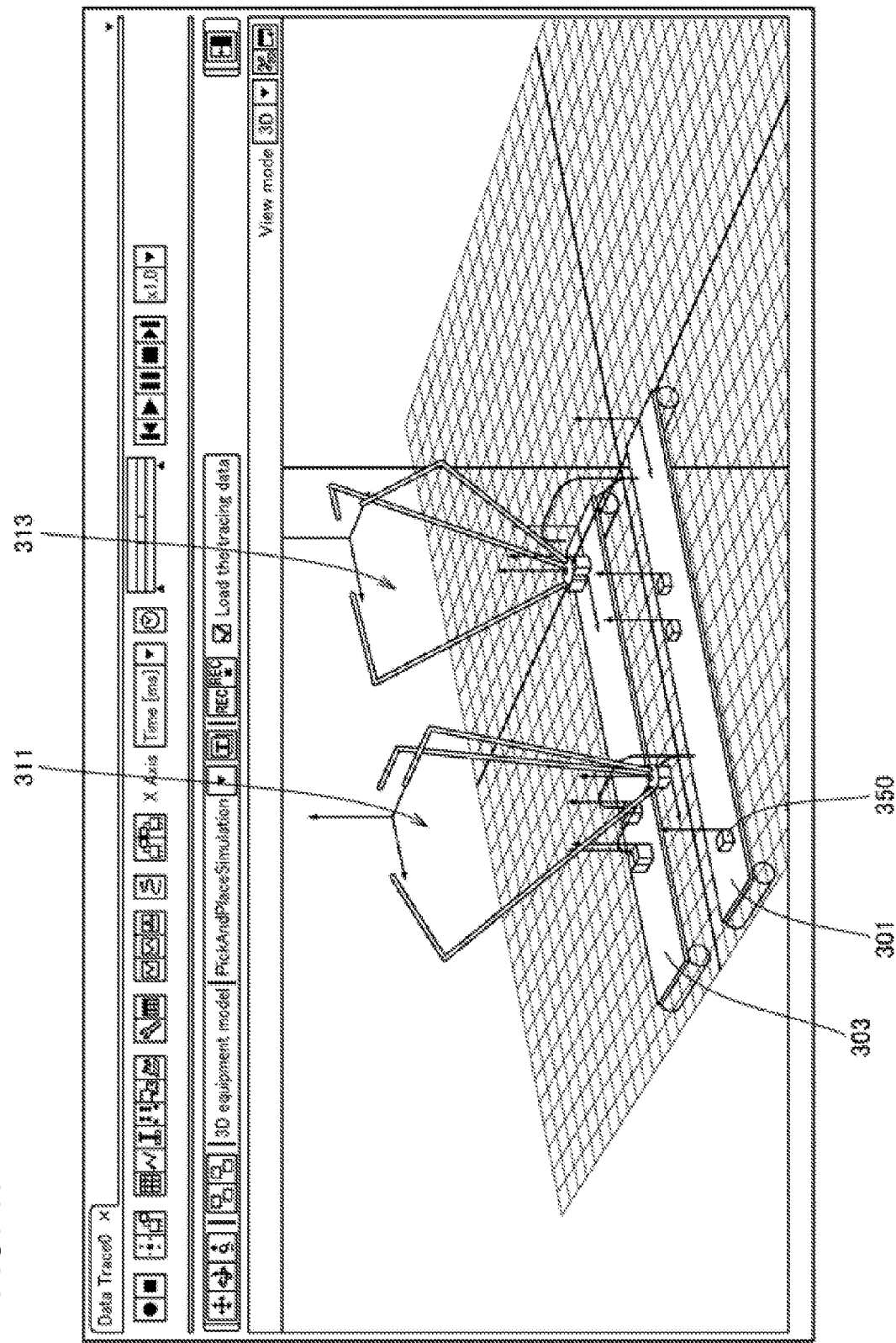
FIG. 17 is a diagram showing an example user interface screen for reproducing the behavior of the system provided by the simulator according to the embodiment.

FIG. 17 is a diagram showing an example user interface screen for reproducing the behavior of the system provided by the simulator 100 according to the present embodiment. With reference to FIG. 17, the behavior of the created system is reproduced based on the results of a control operation executed using the measurement results input from the visual sensor simulator 150. More specifically, the positions and the attitudes of the robots 311 and 313 are updated sequentially based on a control instruction resulting from the control operation executed in the controller simulator 160. This enables observation of the movement of the robots 311 and 313.

The user interface screen also displays the workpiece 350 in the created system model based on the information about the workpiece recognized by the visual sensor simulator 150. Displaying the workpiece 350 in the system model includes placing the workpiece 350 in the imaging area defined for the visual sensor of the created system in accordance with its detected position. The workpiece 350 appears to move in response to the movement of the conveyors 301 and 303. The position of the workpiece 350 changes in accordance with the pick-and-place operation performed by each of the robots 311 and 313. When the image measurement performed by the visual sensor simulator 150 includes recognizing the workpiece using the pre-registered image pattern as described above, the reproduction module 170 may then display, in the system, each workpiece recognized in the visual sensor simulator 150, and may update the position of the workpiece over time.

Tracking and displaying the workpiece 350 in this manner allows the user to easily recognize the behavior of the created system.

In the user interface screen shown in FIG. 17, an object in the three-dimensional virtual space can be rendered in any direction. In other words, the user can freely change a point of view for rendering in the user interface screen. The user may also change the reproduction duration and the reproduction speed.

H. Display Position and Attitude of Workpiece

The procedure for the tracking display of the workpiece shown in FIG. 17 will now be described. More specifically, the procedure for calculating the display position and the attitude of the workpiece and will be described.

The measurement results (including the position of the recognized workpiece) output from the visual sensor simulator 150 are transformed into the coordinates in the reference coordinate system (robot coordinate system), and the resultant coordinates are input into the controller simulator 160. In contrast, the system model is defined in accordance with the world coordinate system in the three-dimensional virtual space 300. To reproduce the behavior of the created system, the coordinates in the reference coordinate system (robot coordinate system) are transformed into the coordinates in the world coordinate system. More specifically, the reproduction module 170 transforms the coordinates of the workpiece obtained through the image measurement in the visual sensor simulator 150 into the coordinates in the world coordinate system defining the created system, and displays each workpiece in the created system.

The parameters for transforming the coordinates in the reference coordinate system (robot coordinate system) into the coordinates in the world coordinate system may be calculated in the same manner as for the parameters for transforming the coordinates in the camera coordinate system into the coordinates in the reference coordinate system (robot coordinate system) as described above.

More specifically, for each of any four points selected in the reference coordinate system (robot coordinate system), the coordinates in the reference coordinate system (robot coordinate system) and the coordinates in the world coordinate system are calculated. The calculated sets of the coordinates can be used to calculate coefficients A1, B1, C1, D1, E1, and F1 for transforming the coordinates in the reference coordinate system (robot coordinate system) into the coordinates in the world coordinate system. The coordinates of the workpiece detected in the visual sensor simulator 150 are x and y. In this case, the initial display position at the input into the controller simulator 160 can be calculated using the coefficients for transformation.

$$\text{Initial display position of workpiece}(X) = A1 \times x + B1 \times y + C1$$

$$\text{Initial display position of workpiece}(Y) = D1 \times x + E1 \times y + F1$$

The simulator 100 with the functional structure shown in FIG. 5 can involve a time lag between when an image of a workpiece is captured and the resultant image data is generated, image measurement of the image data is performed using the visual sensor simulator 150, and when the measurement results are input to the controller simulator 160. During this time lag, the workpiece is being transported by the conveyor. Thus, the distance moved by the workpiece during the time lag is to be corrected.

The distance moved by the workpiece from when image data is obtained for a workpiece to when the coordinates of the workpiece are calculated may be calculated by, for example, evaluating the difference between the corresponding encoder values provided from the encoder 236 (FIG. 1). As described above, the movement per pulse is calculated preliminary, the moving distance may be calculated based on the difference between the encoder values at each timing and the corresponding timing when the image is captured. When the encoder value at the current timing is Ec, the encoder value at the timing when the image is captured is Et, and the transform coefficient in the local coordinate system for the conveyor is C, the correction distance described below is added to the moving distance in X-direction of the local coordinate system for the conveyor immediately after the initial display of the workpiece.

$$\text{Correction distance} = (Ec - Et) \times C$$

After the initial display, the display position of each workpiece is updated sequentially in accordance with changes in the encoder value. This updating process for the display position allows reproduction of the workpiece that is being transported on the conveyor.

Figure 18:
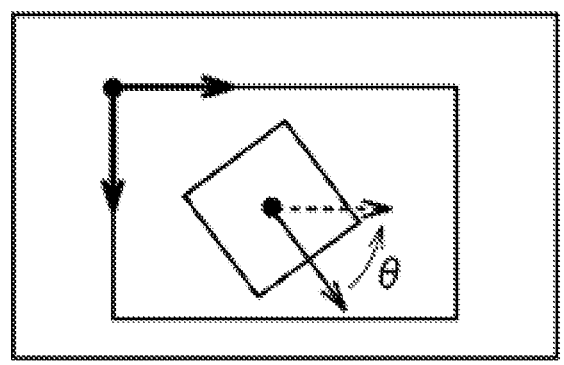
FIG. 18 is a diagram describing the display mode for the attitude of a workpiece in the camera coordinate system in the simulator according to the embodiment.

FIG. 18 is a diagram describing the display mode for the attitude of the workpiece in the camera coordinate system in the simulator 100 according to the present embodiment. With reference to FIG. 18, depending on the setting of the camera coordinate system for the image data, the rotation angle (attitude) of the workpiece included in the measurement results output from the visual sensor simulator 150 is reflected in the workpiece in the three-dimensional virtual space.

I. Display Examples

The user interface for reproducing the behavior of the system shown in FIG. 17 may further display additional information. Display examples for such additional information will now be described.

i1: Display Example 1

Figure 19:
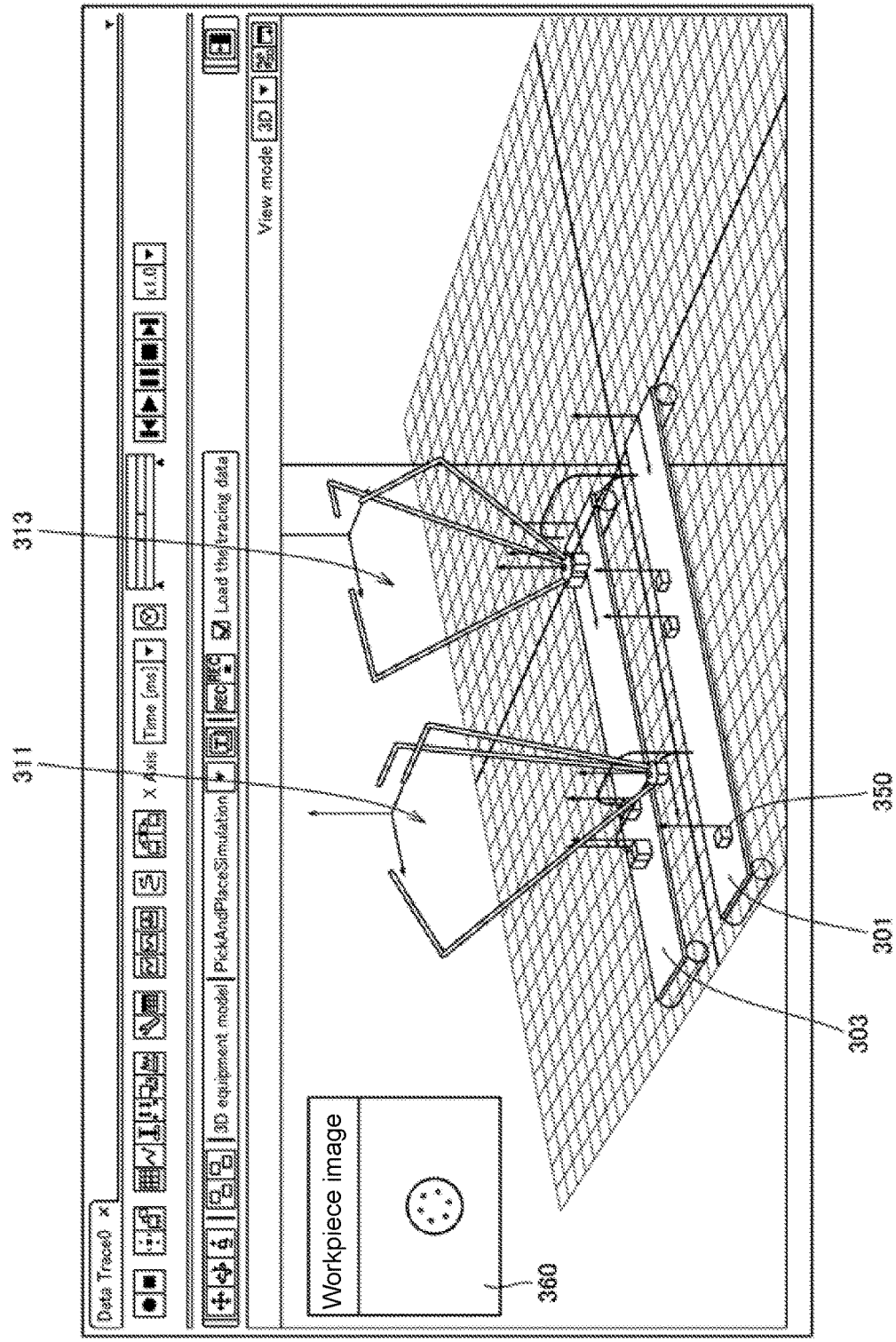
FIG. 19 is a diagram showing another example user interface screen for reproducing the behavior of the system provided by the simulator according to the embodiment.

FIG. 19 is a diagram showing another example user interface screen for reproducing the behavior of the system provided by the simulator 100 according to the present embodiment. Unlike the user interface screen shown in FIG. 17, the user interface screen shown in FIG. 19 shows measurement results 360 including an input image used for the image measurement performed using the visual sensor simulator 150. The measurement results 360 are displayed together with the reproduced behavior or the system. In other words, the reproduction module 170 outputs the measurement results from the visual sensor simulator 150 in correspondence with the behavior of the created system at the timing when the measurement results are output. The output may further include the image data that has undergone the measurement together with the measurement results from the visual sensor simulator 150. The measurement results may be superimposed on the image data, or the input image data and the measurement results may be displayed side by side.

Figure 20:
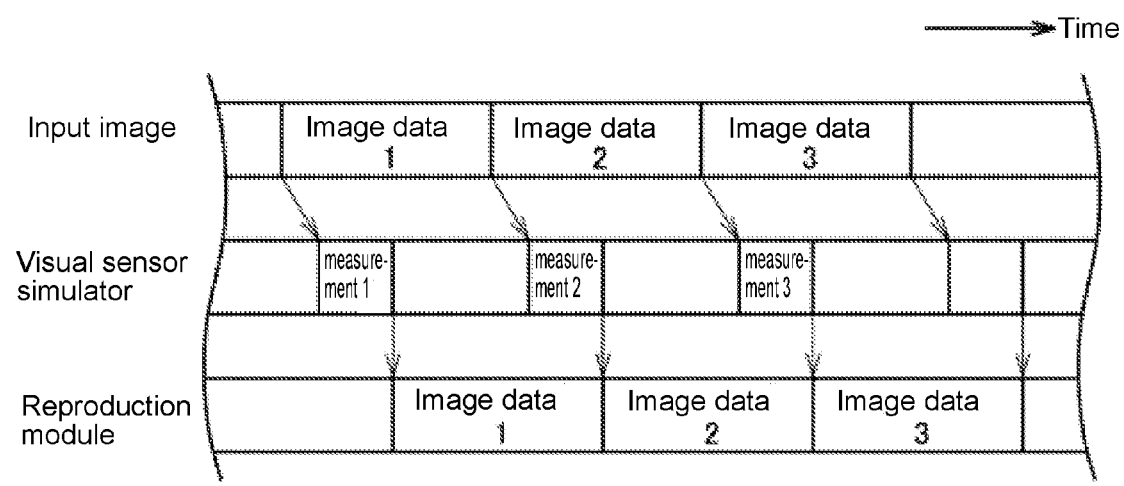
FIG. 20 is a diagram describing the timings of display on the user interface screen shown in FIG. 19.

FIG. 20 is a diagram describing the timings of display on the user interface screen shown in FIG. 19. With reference to FIG. 20, image data is periodically input into the visual sensor simulator 150, and its image measurement is performed. The image measurement results are then output. For example, the measurement results 360 shown in FIG. 19 are updated at the output timing of the image measurement results. The simulation results may be reproduced in parallel with the simulation, or may be reproduced after the simulation is complete. In this case as well, the image data to be displayed may be switched between different pieces of image data sequentially at the timings shown in FIG. 20.

As described above, the measurement results 360 are displayed and updated at the timings in correspondence with the behavior of the system. This allows easy determination of the cause of any failure in the system, and further allows more accurate evaluation of the tact time or the performance of the system model.

i2: Display Example 2

Figure 21:
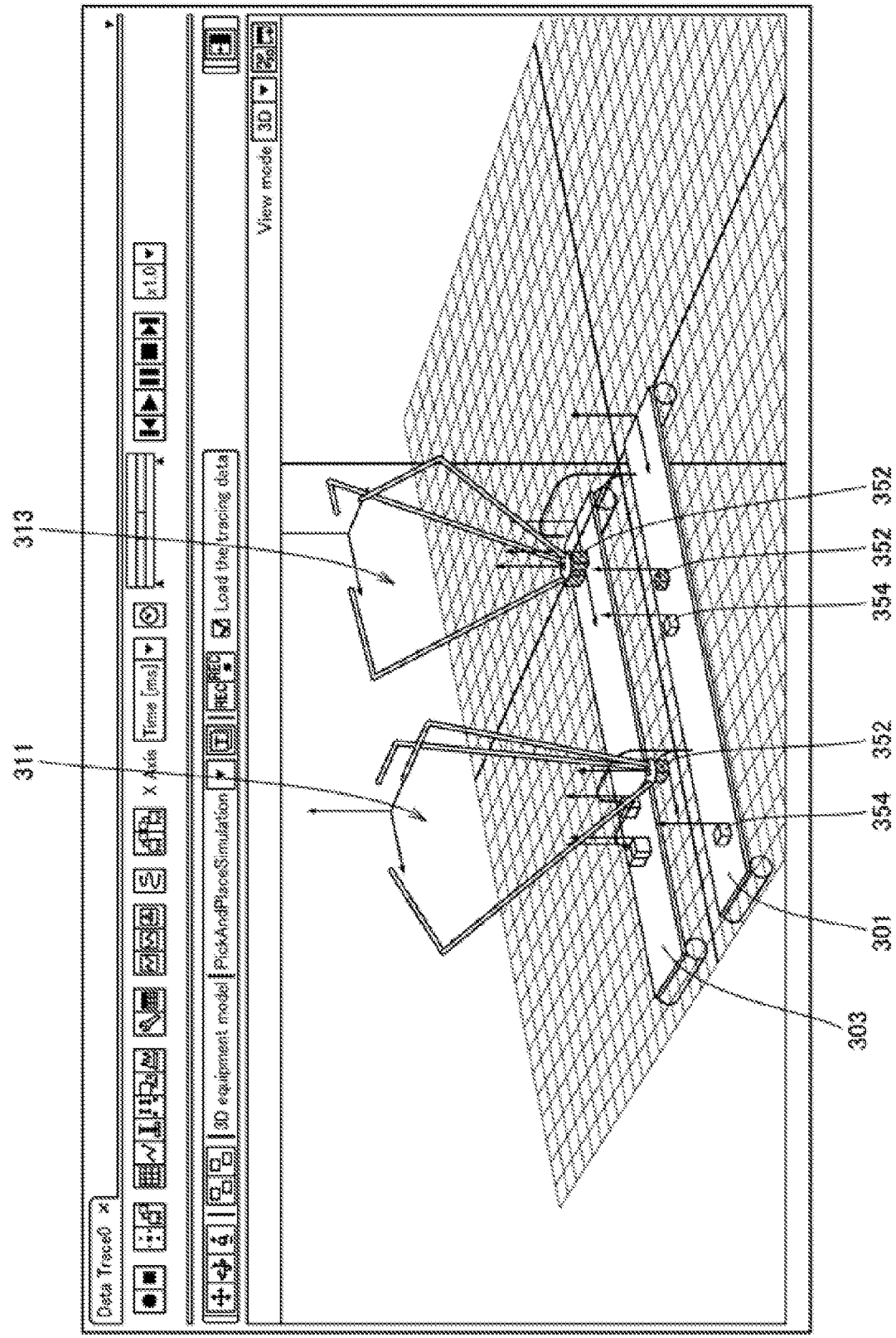
FIG. 21 is a diagram showing still another example user interface screen for reproducing the behavior of the system provided by the simulator according to the embodiment.

FIG. 21 is a diagram showing still another example user interface screen for reproducing the behavior of the system provided by the simulator 100 according to the present embodiment. Unlike the user interface screen shown in FIG. 17, the user interface screen shown in FIG. 21 additionally includes information indicating the results of the image measurement of each workpiece displayed in the three-dimensional virtual space.

This additional information may include information indicating whether a workpiece satisfies a pre-registered condition set for a non-defective product in the image measurement. For example, a workpiece 352 determined to be non-defective and a workpiece 354 determined to be defective may virtually appear in different display modes.

More specifically, when the image measurement performed using the visual sensor simulator 150 includes determining whether the input image data satisfies the pre-registered condition, the reproduction module 170 may additionally include information indicating whether each workpiece appearing in the created system satisfies the pre-registered condition.

These display modes allow easy determination of the cause of any failure in the system, and further allow more accurate evaluation of the tact time or the performance of the system model.

J. Advantages

The simulator 100 according to the present embodiment reduces the workload in settings using preliminary obtained image data of a target such as a workpiece, and allows more accurate evaluation of the performance of a system to be simulated.

The embodiments disclosed herein should be considered to be in all respects illustrative and not restrictive. The scope of the present invention is determined not by the description given above but by the claims, and is construed as including any modification that comes within the meaning and range of equivalency of the claims.

REFERENCE SIGNS LIST 1, 2 manufacturing system
100 simulator
102 processor
104 main memory
106 input unit
108 display unit
110 network interface
112 optical drive
114 optical disc
116 communication interface
118 internal bus
120 hard disk
122 OS
124 simulation program
140 image data group
150 visual sensor simulator
152 setting parameter
160 controller simulator
162 control program
170 reproduction module
172 three-dimensional design data
180 user interface module
182 model creating module
184 imaging area setting reception module
186 calibration parameter calculation module
200 controller
202 network
210, 311, 313 robot
220 visual sensor
222 imaging unit
230, 301, 302 conveyor
232, 350, 352, 354 workpiece
234 drive roller
236 encoder
303 conveyor coordinate system
312 robot coordinate system
320 world coordinate system
330 imaging area
360 measurement result

The invention claimed is:

1. A simulator for estimating a behavior of a system comprising a visual sensor, the simulator comprising a processor configured with a program to perform operations comprising:
   operation as a creating unit configured to virtually create a simulation target system corresponding to the system in a three-dimensional virtual space comprising an imaging area for the visual sensor;
   operation as a measurement unit configured to: perform image measurement of preliminary obtained image data obtained using the visual sensor; and output a measurement result;

operation as a reception unit configured to receive a setting defining the imaging area for the visual sensor in a manner associated with the simulation target system;

operation as a calculation unit configured to: calculate a transform parameter based on a relative positional relationship between the simulation target system and the imaging area; and calculate a result of transforming the measurement result using the transform parameter; and operation as an execution unit configured to: receive the result of transforming the measurement result; and execute a control operation using the result of transforming the measurement result as an input.

2. The simulator according to claim 1, wherein
the simulation target system comprises a robot configured to operate in accordance with a result of the control operation, and
the processor is configured with the program such that calculating the result of transforming the measurement result using the transform parameter comprises transforming, according to the transform parameter, coordinates in a camera coordinate system output as the measurement result into coordinates in a robot coordinate system defining a behavior of the robot.

3. The simulator according to claim 1, wherein the processor is further configured with the program to perform operations comprising:
operation as a reproduction unit configured to reproduce a behavior of the simulation target system using time-series data for the control operation output from the execution unit.

4. The simulator according to claim 3, wherein the processor is configured with the program such that:
the image measurement comprises recognizing a workpiece based on a pre-registered image pattern; and
operation as the reproduction unit comprises operation as the reproduction unit that displays, in the simulation target system, the workpiece recognized by the measurement unit, and updates a position of the workpiece over time.

5. The simulator according to claim 4, wherein
the processor is configured with the program to perform operations such that operation as the reproduction unit comprises operation as the reproduction unit that transforms coordinates of the workpiece obtained through the image measurement into coordinates in a world coordinate system defining the simulation target system, and displays the workpiece in the simulation target system.

6. The simulator according to claim 4, wherein
the processor is configured with the program such that operation as the calculation unit comprises operation as the calculation unit that calculates a transform coefficient for transformation between a unit movement of a device that moves the workpiece in the simulation target system and a moving speed of the workpiece in the simulation target system.

7. The simulator according to claim 6, wherein the processor is configured with the program such that:
the image measurement comprises determining whether input image data satisfies a pre-registered condition; and
operation as the reproduction unit comprises operation as the reproduction unit that indicates whether the workpiece displayed in the simulation target system satisfies the pre-registered condition.

8. The simulator according to claim 3, wherein
the processor is configured with the program such that operation as the reproduction unit comprises operation as the reproduction unit that outputs the measurement result from the measurement unit, together with the behavior of the simulation target system, in correspondence with a time when the measurement result is output.

9. The simulator according to claim 8, wherein
the processor is configured with the program such that operation as the reproduction unit comprises operation as the reproduction unit that outputs target image data together with the measurement result from the measurement unit.

10. A simulation method implemented by a computer for estimating a behavior of a system comprising a visual sensor, the method comprising:
virtually creating a virtual target system corresponding to the system in a three-dimensional virtual space comprising an imaging area for the visual sensor;
performing image measurement of preliminary obtained image data obtained using the visual sensor, and outputting a measurement result;
receiving a setting defining the imaging area for the visual sensor associated with the virtual target system;
calculating a transform parameter based on a relative positional relationship between the virtual target system and the imaging area;
calculating a result of transforming the measurement result using the transform parameter;
receiving the result of transforming the measurement result; and
executing a control operation using the result of transforming the measurement result as an input.

11. The method according to claim 10, wherein:
the virtual target system comprises a robot configured to operate in accordance with a result of the control operation; and
calculating the result of transforming the measurement result using the transform parameter comprises transforming, according to the transform parameter, coordinates in a camera coordinate system output as the measurement result into coordinates in a robot coordinate system defining behavior of the robot.

12. The method according to claim 11, further comprising outputting the measurement result, together with the behavior of the virtual target system, in correspondence with a time when the measurement result is output.

13. The method according to claim 12, further comprising outputting target image data together with the measurement result.

14. The method according to claim 10, further comprising reproducing a behavior of the virtual target system using time-series data for the control operation.

15. The method according to claim 14, further comprising:
recognizing a workpiece based on a pre-registered image pattern;
displaying, in the virtual target system, the workpiece; and
updating a position of the workpiece over time.

16. The method according to claim 15, further comprising:
transforming coordinates of the workpiece into coordinates in a world coordinate system defining the virtual target system; and
displaying the workpiece in the virtual target system.

17. The method according to claim 15, further comprising calculating a transform coefficient for transformation between a unit movement of a device that moves the workpiece in the virtual target system and a moving speed of the workpiece in the virtual target system.

18. The method according to claim 17, further comprising:
- determining whether input image data satisfies a pre-registered condition; and
- indicating whether the workpiece displayed in the virtual target system satisfies the pre-registered condition.

19. A non-transitory computer-readable medium storing a simulation program for estimating a behavior of a system comprising a visual sensor, the simulation program causing a processor to perform operations comprising:
- virtually creating a virtual target system corresponding to the system in a three-dimensional virtual space comprising an imaging area for the visual sensor;
- performing image measurement of preliminary obtained image obtained using the visual sensor, and outputting a measurement result;
- receiving a setting defining the imaging area for the visual sensor in a manner associated with the virtual target system;
- calculating a transform parameter based on a relative positional relationship between the virtual target system and the imaging area;
- calculating a result of transforming the measurement result using the transform parameter;
- receiving the result of transforming the measurement result; and
- executing a control operation using the result of transforming the measurement result as an input.

* * * * *